United States Patent [19]
Groff et al.

[11] Patent Number: 5,787,411
[45] Date of Patent: Jul. 28, 1998

[54] METHOD AND APPARATUS FOR DATABASE FILTER GENERATION BY DISPLAY SELECTION

[75] Inventors: Shane L. Groff, Kirkland; Timothy P. McKee, Seattle, both of Wash.

[73] Assignee: Microsoft Corporation, Redmond, Wash.

[21] Appl. No.: 619,018

[22] Filed: Mar. 20, 1996

[51] Int. Cl.$^6$ ................................................ G06F 11/30
[52] U.S. Cl. .................................... 707/2; 707/4
[58] Field of Search ........................ 365/60, 61, 62; 707/2, 4

[56] References Cited

U.S. PATENT DOCUMENTS

| | | | |
|---|---|---|---|
| 4,506,326 | 3/1985 | Shaw et al. | 395/604 |
| 5,265,246 | 11/1993 | Li et al. | 395/604 |
| 5,301,313 | 4/1994 | Terada et al. | 395/604 |
| 5,421,008 | 5/1995 | Banning et al. | 707/4 |
| 5,426,781 | 6/1995 | Kaplan et al. | 395/604 |
| 5,428,737 | 6/1995 | Li et al. | 395/604 |
| 5,455,945 | 10/1995 | VanderDrift | 707/2 |
| 5,499,368 | 3/1996 | Tate et al. | 395/604 |
| 5,519,859 | 5/1996 | Grace | 395/603 |
| 5,544,355 | 8/1996 | Chaudhuri et al. | 707/2 |
| 5,566,330 | 10/1996 | Sheffield | 395/604 |
| 5,584,024 | 12/1996 | Schwartz | 395/604 |
| 5,608,899 | 3/1997 | Li et al. | 395/604 |
| 5,630,120 | 5/1997 | Vachey | 395/602 |

Primary Examiner—Wayne Amsbury
Attorney, Agent, or Firm—Duft, Graziano & Forest, P.C.

[57] ABSTRACT

A method for selecting records from a displayed database table by generating an SQL SELECT command for filtering the displayed records in accordance with cell values highlighted by user input. A presently selected set of records from a desired table (generally referred to as a record set or record source) are displayed on the user's display screen. The user selects particular values in cells (an intersection of a row and a column of the displayed table) by highlighting the values using the pointer device or keyboard of the computer system. Methods of the present invention then generate an SQL select (filter) command to selectively retrieve those records from the displayed records which match the user's highlighted values. A fully highlighted cell indicates exact equality is desired by the user, a beginning portion highlighted indicates that the user wishes to match records whose corresponding column starts with the highlighted value, and ending portion selection matches the ending portion of qualified records, and a middle portion highlighted matches any record containing the highlighted value. Values highlighted in the same row generate logically AND'd clauses in the SELECT command while the comparison generated for a row are logically OR'd with the comparisons generated for other rows. The user may indicate that the highlighted values are for selection (inclusion of qualified records) or for exclusion selection (exclusion of qualified records). A new select (filter) command may be logically AND'd with the prior filter to permit complex selection criteria to be defined by simple graphical user inputs.

32 Claims, 20 Drawing Sheets

| Order ID 600 | Customer 602 | Employee 604 | Order Date 606 | Required Date 608 | Shipped Date 610 |
|---|---|---|---|---|---|
| 10248 | Vins et alcools Chevalier | Buchanan, Steven | 01-Jul-93 | 29-Jul-93 | 13-Jul-93 |
| 10249 | Toms Spezialitäten | Suyama, Michael | 02-Jul-93 | 13-Aug-93 | 07-Jul-93 |
| 10250 | Hanari Carnes | Peacock, Margaret | 05-Jul-93 | 02-Aug-93 | 09-Jul-93 |
| 10251 | Vi... en stock / Filter By Selection | | 05-Jul-93 | 02-Aug-93 | 12-Jul-93 |
| 10252 | Su... ~es / Filter Excluding Selection | aret | 06-Jul-93 | 03-Aug-93 | 08-Jul-93 |
| 10253 | Hana. 1000 / Remove Filter/Sort | t | 07-Jul-93 | 21-Jul-93 | 13-Jul-93 |
| 10254 | Chop-suey Chinese / Sort Ascending | en | 08-Jul-93 | 05-Aug-93 | 20-Jul-93 |
| 10255 | Richter Supermarkt / Sort Descending | he | 09-Jul-93 | 06-Aug-93 | 12-Jul-93 |
| 10256 | Wellington Importadora | Leverling, Janet | 12-Jul-93 | 09-Aug-93 | 14-Jul-93 |
| 10257 | HILARIÓN-Abastos | Peacock, Margaret | 13-Jul-93 | 10-Aug-93 | 19-Jul-93 |
| 10258 | Ernst Handel 800 | Davolio, Nancy | 14-Jul-93 | 11-Aug-93 | 20-Jul-93 |
| 10259 | Centro comercial Moctezu. | Peacock, Margaret | 15-Jul-93 | 12-Aug-93 | 22-Jul-93 |
| 10260 | Ottilies Käseladen | Peacock, Margaret | 16-Jul-93 | 13-Aug-93 | 26-Jul-93 |
| 10261 | Que Delícia | Peacock, Margaret | 16-Jul-93 | 13-Aug-93 | 27-Jul-93 |
| 10262 | Rattlesnake Canyon Grocery | Callahan, Laura | 19-Jul-93 | 16-Aug-93 | 22-Jul-93 |
| 10263 | Ernst Handel | Dodsworth, Anne | 20-Jul-93 | 17-Aug-93 | 28-Jul-93 |
| 10264 | Folk och fä HB | Suyama, Michael | 21-Jul-93 | 18-Aug-93 | 20-Aug-93 |
| 10265 | Blondel père et fils | Fuller, Andrew | 22-Jul-93 | 19-Aug-93 | 09-Aug-93 |
| 10266 | Wartian Herkku | Leverling, Janet | 23-Jul-93 | 03-Sep-93 | 28-Jul-93 |
| 10267 | Frankenversand | Peacock, Margaret | 26-Jul-93 | 23-Aug-93 | 03-Aug-93 |
| 10268 | GROSELLA-Restaurante | Callahan, Laura | 27-Jul-93 | 24-Aug-93 | 30-Jul-93 |
| 10269 | White Clover Markets | Buchanan, Steven | 28-Jul-93 | 11-Aug-93 | 06-Aug-93 |
| 10270 | Wartian Herkku | Davolio, Nancy | 29-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |

FIG. 6

| Order ID | Customer | Employee | Order Date | Required Date | Shipped Date |
|---|---|---|---|---|---|
| 10248 | Vins et alcools Chevalier | Buchanan, Steven | 01-Jul-93 | 29-Jul-93 | 13-Jul-93 |
| 10249 | Toms Spezialitäten | Suyama, Michael | 02-Jul-93 | 13-Aug-93 | 07-Jul-93 |
| 10250 | Hanari Carnes | Peacock, Margaret | 05-Jul-93 | 02-Aug-93 | 09-Jul-93 |
| 10251 | Victuailles en stock | Leverling, Janet | 05-Jul-93 | 02-Aug-93 | 12-Jul-93 |
| 10252 | Suprêmes délices | Peacock, Margaret | 06-Jul-93 | 03-Aug-93 | 08-Jul-93 |
| 10253 | Hanari Carnes | Leverling, Janet | 07-Jul-93 | 21-Jul-93 | 13-Jul-93 |
| 10254 | Chop-suey Chinese | Buchanan, Steven | 08-Jul-93 | 05-Aug-93 | 20-Jul-93 |
| 10255 | Richter Supermarkt | Dodsworth, Anne | 09-Jul-93 | 06-Aug-93 | 12-Jul-93 |
| 10256 | Wellington Importadora | Leverling, Janet | 12-Jul-93 | 09-Aug-93 | 14-Jul-93 |
| 10257 | HILARION-Abastos | Peacock, Margaret | 13-Jul-93 | 10-Aug-93 | 19-Jul-93 |
| 10258 | Ernst Handel | Davolio, Nancy | 14-Jul-93 | 11-Aug-93 | 20-Jul-93 |
| 10259 | Centro comercial Moctezuma | Peacock, Margaret | 15-Jul-93 | 12-Aug-93 | 22-Jul-93 |
| 10260 | Ottilies Käseladen | Peacock, Margaret | 16-Jul-93 | 13-Aug-93 | 26-Jul-93 |
| 10261 | Que Delícia | Peacock, Margaret | 16-Jul-93 | 13-Aug-93 | 27-Jul-93 |
| 10262 | Rattlesnake Canyon Grocery | Callahan, Laura | 19-Jul-93 | 16-Aug-93 | 22-Jul-93 |
| 10263 | Ernst Handel | Dodsworth, Anne | 20-Jul-93 | 17-Aug-93 | 28-Jul-93 |
| 10264 | Folk och fä HB | Suyama, Michael | 21-Jul-93 | 18-Aug-93 | 20-Aug-93 |
| 10265 | Blondel père et fils | Fuller, Andrew | 22-Jul-93 | 19-Aug-93 | 09-Aug-93 |
| 10266 | Wartian Herkku | Leverling, Janet | 23-Jul-93 | 03-Sep-93 | 28-Jul-93 |
| 10267 | Frankenversand | Peacock, Margaret | 26-Jul-93 | 23-Aug-93 | 03-Aug-93 |
| 10268 | GROSELLA-Restaurante | Callahan, Laura | 27-Jul-93 | 24-Aug-93 | 30-Jul-93 |
| 10269 | White Clover Markets | Buchanan, Steven | 28-Jul-93 | 11-Aug-93 | 06-Aug-93 |
| 10270 | Wartian Herkku | Davolio, Nancy | 29-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |

600 → Order ID; 602 → Customer; 604 → Employee; 606 → Order Date; 608 → Required Date; 610 → Shipped Date

FIG. 7

| Order ID | Customer | Employee | Order Date | Required Date | Shipped Date |
|---|---|---|---|---|---|
| 10248 | Vins et alcools Chevalier | Buchanan, Steven | 01-Jul-93 | 29-Jul-93 | 13-Jul-93 |
| 10249 | Toms Spezialitäten | Suyama, Michael | 02-Jul-93 | 13-Aug-93 | 07-Jul-93 |
| 10250 | Hanari Carnes | Peacock, Margaret | 05-Jul-93 | 02-Aug-93 | 09-Jul-93 |
| 10251 | Victuailles en stock | Leverling, Janet | 05-Jul-93 | 02-Aug-93 | 12-Jul-93 |
| 10252 | Suprêmes délices | Peacock, Margaret | 06-Jul-93 | 03-Aug-93 | 08-Jul-93 |
| 10253 | Hanari Carnes | Leverling, Janet | 07-Jul-93 | 21-Jul-93 | 13-Jul-93 |
| 10254 | Chop-suey Chinese | Buchanan, Steven | 08-Jul-93 | 05-Aug-93 | 20-Jul-93 |
| 10255 | Richter Supermarkt | Dodsworth, Anne | 09-Jul-93 | 06-Aug-93 | 12-Jul-93 |
| 10256 | Wellington Importadora | Leverling, Janet | 12-Jul-93 | 09-Aug-93 | 14-Jul-93 |
| 10257 | HILARIÓN-Abastos | Peacock, Margaret | 13-Jul-93 | 10-Aug-93 | 19-Jul-93 |
| 10258 | Ernst Handel | Davolio, Nancy | 14-Jul-93 | 11-Aug-93 | 20-Jul-93 |
| 10259 | Centro comercial Moctezuma | Peacock, Margaret | 15-Jul-93 | 12-Aug-93 | 22-Jul-93 |
| 10260 | Ottilies Käseladen | Peacock, Margaret | 16-Jul-93 | 13-Aug-93 | 26-Jul-93 |
| 10261 | Que Delicia | Peacock, Margaret | 16-Jul-93 | 13-Aug-93 | 27-Jul-93 |
| 10262 | Rattlesnake Canyon Grocery | Callahan, Laura | 19-Jul-93 | 16-Aug-93 | 22-Jul-93 |
| 10263 | Ernst Handel | Dodsworth, Anne | 20-Jul-93 | 17-Aug-93 | 28-Jul-93 |
| 10264 | Folk och fä HB | Suyama, Michael | 21-Jul-93 | 18-Aug-93 | 20-Aug-93 |
| 10265 | Blondel père et fils | Fuller, Andrew | 22-Jul-93 | 19-Aug-93 | 09-Aug-93 |
| 10266 | Wartian Herkku | Leverling, Janet | 23-Jul-93 | 03-Sep-93 | 28-Jul-93 |
| 10267 | Frankenversand | Peacock, Margaret | 26-Jul-93 | 23-Aug-93 | 03-Aug-93 |
| 10268 | GROSELLA-Restaurante | Callahan, Laura | 27-Jul-93 | 24-Aug-93 | 30-Jul-93 |
| 10269 | White Clover Markets | Buchanan, Steven | 28-Jul-93 | 11-Aug-93 | 06-Aug-93 |
| 10270 | Wartian Herkku | Davolio, Nancy | 29-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |

FIG. 8

| Order ID | Customer | Employee | Order Date | Required Date | Shipped Date |
|---|---|---|---|---|---|
| 10248 | Vins et alcools Chevalier | Buchanan, Steven | 01-Jul-93 | 29-Jul-93 | 13-Jul-93 |
| 10249 | Toms Spezialitäten | Suyama, Michael | 02-Jul-93 | 13-Aug-93 | 07-Jul-93 |
| 10250 | Hanari Carnes | Peacock, Margaret | 05-Jul-93 | 02-Aug-93 | 09-Jul-93 |
| 10251 | Victuailles en stock | Leverling, Janet | 05-Jul-93 | 02-Aug-93 | 12-Jul-93 |
| 10252 | Suprêmes délices | Peacock, Margaret | 06-Jul-93 | 03-Aug-93 | 08-Jul-93 |
| 10253 | Hanari Carnes | Leverling, Janet | 07-Jul-93 | 21-Jul-93 | 13-Jul-93 |
| 10254 | Chop-suey Chinese | *Filter By Selection* | 08-Jul-93 | 05-Aug-93 | 20-Jul-93 |
| 10255 | Richter Supermarkt | Filter Excluding Selection | 09-Jul-93 | 06-Aug-93 | 12-Jul-93 |
| 10256 | Wellington Importador | Remove Filter/Sort | 12-Jul-93 | 09-Aug-93 | 14-Jul-93 |
| 10257 | HILARIÓN- | Sort Ascending | 13-Jul-93 | 10-Aug-93 | 19-Jul-93 |
| 10258 | Ernst Ha 800 | Sort Descending | 14-Jul-93 | 11-Aug-93 | 20-Jul-93 |
| 10259 | Centro c | aret | 15-Jul-93 | 12-Aug-93 | 22-Jul-93 |
| 10260 | Ottilies Käseladen | Peacock, Margaret | 16-Jul-93 | 13-Aug-93 | 26-Jul-93 |
| 10261 | Que Delícia | Peacock, Margaret | 16-Jul-93 | 13-Aug-93 | 27-Jul-93 |
| 10262 | Rattlesnake Canyon Grocery | Callahan, Laura | 19-Jul-93 | 16-Aug-93 | 22-Jul-93 |
| 10263 | Ernst Handel | Dodsworth, Anne | 20-Jul-93 | 17-Aug-93 | 28-Jul-93 |
| 10264 | Folk och fä HB | Suyama, Michael | 21-Jul-93 | 18-Aug-93 | 20-Aug-93 |
| 10265 | Blondel père et fils | Fuller, Andrew | 22-Jul-93 | 19-Aug-93 | 09-Aug-93 |
| 10266 | Wartian Herkku | Leverling, Janet | 23-Jul-93 | 03-Sep-93 | 28-Aug-93 |
| 10267 | Frankenversand | Peacock, Margaret | 26-Jul-93 | 23-Aug-93 | 03-Aug-93 |
| 10268 | GROSELLA-Restaurante | Callahan, Laura | 27-Jul-93 | 24-Aug-93 | 30-Jul-93 |
| 10269 | White Clover Markets | Buchanan, Steven | 28-Jul-93 | 11-Aug-93 | 06-Aug-93 |
| 10270 | Wartian Herkku | Davolio, Nancy | 29-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |

FIG. 9

| Order ID | Customer | Employee | Order Date | Required Date | Shipped Date |
|---|---|---|---|---|---|
| 10254 | Chop-suey Chinese | Buchanan, Steven | 08-Jul-93 | 05-Aug-93 | 20-Jul-93 |
| 10370 | Chop-suey Chinese | Suyama, Michael | 30-Nov-93 | 28-Dec-93 | 24-Dec-93 |
| 10519 | Chop-suey Chinese | Suyama, Michael | 25-Apr-94 | 23-May-94 | 28-Apr-94 |
| 10731 | Chop-suey Chinese | King, Robert | 03-Nov-94 | 01-Dec-94 | 11-Nov-94 |
| 10746 | Chop-suey Chinese | Davolio, Nancy | 16-Nov-94 | 14-Dec-94 | 18-Nov-94 |
| 10966 | Chop-suey Chinese | Peacock, Margaret | 17-Mar-95 | 14-Apr-95 | 05-Apr-95 |
| 11029 | Chop-suey Chinese | Peacock, Margaret | 13-Apr-95 | 11-May-95 | 24-Apr-95 |
| 11041 | Chop-suey Chinese | Leverling, Janet | 19-Apr-95 | 17-May-95 | 25-Apr-95 |

FIG. 10

| Order ID | Customer | Employee | Order Date | Required Date | Shipped Date |
|---|---|---|---|---|---|
| 10248 | Vins et alcools Chevalier | Buchanan, Steven | 01-Jul-93 | 29-Jul-93 | 13-Jul-93 |
| 10249 | Toms Spezialitäten | Suyama, Michael | 02-Jul-93 | 13-Aug-93 | 07-Jul-93 |
| 10250 | Hanari Carnes | Peacock, Margaret | 05-Jul-93 | 02-Aug-93 | 09-Jul-93 |
| 10251 | Vi... en stock | ...aret | 05-Jul-93 | 02-Aug-93 | 12-Jul-93 |
| 10252 | Su... ...es | ...t | 06-Jul-93 | 03-Aug-93 | 08-Jul-93 |
| 10253 | Hana... 1000 | ...en | 07-Jul-93 | 21-Jul-93 | 13-Jul-93 |
| 10254 | Chop-suey Chinese | ...he | 08-Jul-93 | 05-Aug-93 | 20-Jul-93 |
| 10255 | Richter Supermarkt | | 09-Jul-93 | 06-Aug-93 | 12-Jul-93 |
| 10256 | Wellington Importadora | Leverling, Janet | 12-Jul-93 | 09-Aug-93 | 14-Jul-93 |
| 10257 | HILARIÓN-Abastos | Peacock, Margaret | 13-Jul-93 | 10-Aug-93 | 19-Jul-93 |
| 10258 | Ernst Handel | Davolio, Nancy | 14-Jul-93 | 11-Aug-93 | 20-Jul-93 |
| 10259 | Centro comercial Moctezu | Peacock, Margaret | 15-Jul-93 | 12-Aug-93 | 22-Jul-93 |
| 10260 | Ottilies Käseladen | Peacock, Margaret | 16-Jul-93 | 13-Aug-93 | 26-Jul-93 |
| 10261 | Que Delícia | Peacock, Margaret | 16-Jul-93 | 13-Aug-93 | 27-Jul-93 |
| 10262 | Rattlesnake Canyon Grocery | Callahan, Laura | 19-Jul-93 | 16-Aug-93 | 22-Jul-93 |
| 10263 | Ernst Handel | Dodsworth, Anne | 20-Jul-93 | 17-Aug-93 | 28-Jul-93 |
| 10264 | Folk och fä HB | Suyama, Michael | 21-Jul-93 | 18-Aug-93 | 20-Aug-93 |
| 10265 | Blondel père et fils | Fuller, Andrew | 22-Jul-93 | 19-Aug-93 | 09-Aug-93 |
| 10266 | Wartian Herkku | Leverling, Janet | 23-Jul-93 | 03-Sep-93 | 28-Jul-93 |
| 10267 | Frankenversand | Peacock, Margaret | 26-Jul-93 | 23-Aug-93 | 03-Aug-93 |
| 10268 | GROSELLA-Restaurante | Callahan, Laura | 27-Jul-93 | 24-Aug-93 | 30-Jul-93 |
| 10269 | White Clover Markets | Buchanan, Steven | 28-Jul-93 | 11-Aug-93 | 06-Aug-93 |
| 10270 | Wartian Herkku | Davolio, Nancy | 29-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |

Popup menu (800):
- Filter By Selection
- Filter Excluding Selection
- Remove Filter/Sort
- Sort Ascending
- Sort Descending Labels: 600 (Order ID), 602 (Customer), 604 (Employee), 606 (Order Date), 608 (Required Date), 610 (Shipped Date)

FIG. 11

| Order ID | Customer | Employee | Order Date | Required Date | Shipped Date |
|---|---|---|---|---|---|
| 10250 | Hanari Carnes | Peacock, Margaret | 05-Jul-93 | 02-Aug-93 | 09-Jul-93 |
| 10253 | Hanari Carnes | Leverling, Janet | 07-Jul-93 | 21-Jul-93 | 13-Jul-93 |
| 10257 | HILARION-Abastos | Peacock, Margaret | 13-Jul-93 | 10-Aug-93 | 19-Jul-93 |
| 10298 | Hungry Owl All-night Grocers | Suyama, Michael | 02-Sep-93 | 30-Sep-93 | 08-Sep-93 |
| 10309 | Hungry Owl All-night Grocers | Leverling, Janet | 16-Sep-93 | 14-Oct-93 | 20-Oct-93 |
| 10335 | Hungry Owl All-night Grocers | King, Robert | 19-Oct-93 | 16-Nov-93 | 21-Oct-93 |
| 10373 | Hungry Owl All-night Grocers | Peacock, Margaret | 02-Dec-93 | 30-Dec-93 | 08-Dec-93 |
| 10375 | Hungry Coyote Import Store | Leverling, Janet | 03-Dec-93 | 31-Dec-93 | 06-Dec-93 |
| 10380 | Hungry Owl All-night Grocers | Callahan, Laura | 09-Dec-93 | 06-Jan-94 | 13-Jan-94 |
| 10394 | Hungry Coyote Import Store | Davolio, Nancy | 22-Dec-93 | 19-Jan-94 | 31-Dec-93 |
| 10395 | HILARION-Abastos | Suyama, Michael | 23-Dec-93 | 20-Jan-94 | 31-Dec-93 |
| 10415 | Hungry Coyote Import Store | Leverling, Janet | 12-Jan-94 | 09-Feb-94 | 21-Jan-94 |
| 10429 | Hungry Owl All-night Grocers | Leverling, Janet | 26-Jan-94 | 09-Mar-94 | 04-Feb-94 |

FIG. 12

| Order ID | Customer | Employee | Order Date | Required Date | Shipped Date |
|---|---|---|---|---|---|
| 10248 | Vins et alcools Chevalier | Buchanan, Steven | 01-Jul-93 | 29-Jul-93 | 13-Jul-93 |
| 10249 | Toms Spezialitäten | Suyama, Michael | 02-Jul-93 | 13-Aug-93 | 07-Jul-93 |
| 10250 | Hanari Carnes | Peacock, Margaret | 05-Jul-93 | 02-Aug-93 | 09-Jul-93 |
| 10251 | Victuailles en stock | *Filter By Selection* | 05-Jul-93 | 02-Aug-93 | 12-Jul-93 |
| 10252 | Suprêmes délices | Filter Excluding Selection | 06-Jul-93 | 03-Aug-93 | 08-Jul-93 |
| 10253 | Hanari Carnes | Remove Filter/Sort | 07-Jul-93 | 21-Jul-93 | 13-Jul-93 |
| 10254 | Chop-suey Chinese | Sort Ascending | 08-Jul-93 | 05-Aug-93 | 20-Jul-93 |
| 10255 | Richter Supermarkt | Sort Descending | 09-Jul-93 | 06-Aug-93 | 12-Jul-93 |
| 10256 | Wellington Importadora | Levering, Janet | 12-Jul-93 | 09-Aug-93 | 14-Jul-93 |
| 10257 | HILARIÓN-Abastos | Peacock, Margaret | 13-Jul-93 | 10-Aug-93 | 19-Jul-93 |
| 10258 | Ernst Handel | Davolio, Nancy | 14-Jul-93 | 11-Aug-93 | 20-Jul-93 |
| 10259 | Centro comercial Moctezuma | Peacock, Margaret | 15-Jul-93 | 12-Aug-93 | 22-Jul-93 |
| 10260 | Ottilies Käseladen | Peacock, Margaret | 16-Jul-93 | 13-Aug-93 | 26-Jul-93 |
| 10261 | Que Delícia | Peacock, Margaret | 16-Jul-93 | 13-Aug-93 | 27-Jul-93 |
| 10262 | Rattlesnake Canyon Grocery | Callahan, Laura | 19-Jul-93 | 16-Aug-93 | 22-Jul-93 |
| 10263 | Ernst Handel | Dodsworth, Anne | 20-Jul-93 | 17-Aug-93 | 28-Jul-93 |
| 10264 | Folk och fä HB | Suyama, Michael | 21-Jul-93 | 18-Aug-93 | 20-Aug-93 |
| 10265 | Blondel père et fils | Fuller, Andrew | 22-Jul-93 | 19-Aug-93 | 09-Aug-93 |
| 10266 | Wartian Herkku | Leverling, Janet | 23-Jul-93 | 03-Sep-93 | 28-Jul-93 |
| 10267 | Frankenversand | Peacock, Margaret | 26-Jul-93 | 23-Aug-93 | 03-Aug-93 |
| 10268 | GROSELLA-Restaurante | Callahan, Laura | 27-Jul-93 | 24-Aug-93 | 30-Jul-93 |
| 10269 | White Clover Markets | Buchanan, Steven | 28-Jul-93 | 11-Aug-93 | 06-Aug-93 |
| 10270 | Wartian Herkku | Davolio, Nancy | 29-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |

FIG. 13

| Order ID | Customer | Employee | Order Date | Required Date | Shipped Date |
|---|---|---|---|---|---|
| 10250 | Hanari Carnes | Peacock, Margaret | 05-Jul-93 | 02-Aug-93 | 09-Jul-93 |
| 10252 | Suprêmes délices | Peacock, Margaret | 06-Jul-93 | 03-Aug-93 | 08-Jul-93 |
| 10253 | Hanari Carnes | Leverling, Janet | 07-Jul-93 | 21-Jul-93 | 13-Jul-93 |
| 10257 | HILARIÓN-Abastos | Peacock, Margaret | 13-Jul-93 | 10-Aug-93 | 19-Jul-93 |
| 10265 | Blondel père et fils | Fuller, Andrew | 22-Jul-93 | 19-Aug-93 | 09-Aug-93 |
| 10269 | White Clover Markets | Buchanan, Steven | 28-Jul-93 | 11-Aug-93 | 06-Aug-93 |
| 10287 | Ricardo Adocicados | Callahan, Laura | 19-Aug-93 | 16-Sep-93 | 25-Aug-93 |
| 10289 | B's Beverages | King, Robert | 23-Aug-93 | 20-Sep-93 | 25-Aug-93 |
| 10292 | Tradicao Hipermercados | Davolio, Nancy | 25-Aug-93 | 22-Sep-93 | 30-Aug-93 |
| 10297 | Blondel père et fils | Buchanan, Steven | 01-Sep-93 | 13-Oct-93 | 07-Sep-93 |
| 10298 | Hungry Owl All-Night Grocers | Suyama, Michael | 02-Sep-93 | 30-Sep-93 | 08-Sep-93 |
| 10299 | Ricardo Adocicados | Peacock, Margaret | 03-Sep-93 | 01-Oct-93 | 10-Sep-93 |
| 10302 | Suprêmes délices | Peacock, Margaret | 07-Sep-93 | 05-Oct-93 | 06-Oct-93 |
| 10308 | Ana Trujillo Emparedados y helas | King, Robert | 15-Sep-93 | 13-Oct-93 | 21-Sep-93 |
| 10309 | Hungry Owl All-Night Grocers | Leverling, Janet | 16-Sep-93 | 14-Oct-93 | 20-Oct-93 |
| 10399 | Pericles Comidas clasicas | King, Robert | 01-Oct-93 | 29-Oct-93 | 20-Oct-93 |
| 10324 | Save-a-lot Markets | Dodsworth, Anne | 05-Oct-93 | 02-Nov-93 | 07-Oct-93 |
| 10326 | Bolido Comidas preparadas | Peacock, Margaret | 07-Oct-93 | 04-Nov-93 | 11-Oct-93 |
| 10335 | Hungry Owl All-Night Grocers | King, Robert | 19-Oct-93 | 16-Nov-93 | 21-Oct-93 |
| 10336 | Princesa Isabel Vinhos | King, Robert | 20-Oct-93 | 17-Nov-93 | 22-Oct-93 |
| 10344 | White Clover Markets | Peacock, Margaret | 29-Oct-93 | 26-Nov-93 | 02-Nov-93 |
| 10354 | Pericles Comidas clasicas | Callahan, Laura | 11-Nov-93 | 09-Dec-93 | 17-Nov-93 |
| 10359 | Seven Seas Imports | Buchanan, Steven | 18-Nov-93 | 16-Dec-93 | 23-Nov-93 |
| 10360 | Blondel père et fils | Peacock, Margaret | 19-Nov-93 | 17-Dec-93 | 29-Nov-93 |
| 10373 | Hungry Owl All-Night Grocers | Peacock, Margaret | 02-Dec-93 | 30-Dec-93 | 08-Dec-93 |

600 — Order ID
602 — Customer
604 — Employee
606 — Order Date
608 — Required Date
610 — Shipped Date

FIG. 14

| Order ID 600 | Customer 602 | Employee 604 | Order Date 606 | Required Date 608 | Shipped Date 610 |
|---|---|---|---|---|---|
| 10248 | Vins et alcools Chevalier | Buchanan, Steven | 01-Jul-93 | 29-Jul-93 | 13-Jul-93 |
| 10249 | Toms Spezialitäten | Suyama, Michael | 02-Jul-93 | 13-Aug-93 | 07-Jul-93 |
| 10250 | Hanari Carnes | Peacock, Margaret | 05-Jul-93 | 02-Aug-93 | 09-Jul-93 |
| 10251 | Victuailles en stock | Leverling, Janet | 05-Jul-93 | 02-Aug-93 | 12-Jul-93 |
| 10252 | Suprêmes délices | Peacock, Margaret | 06-Jul-93 | 03-Aug-93 | 08-Jul-93 |
| 10253 | Hanari Carnes | Leverling, Janet | 07-Jul-93 | 21-Jul-93 | 13-Jul-93 |
| 10254 | Chop-suey Chi | Buchanan, Steven | 08-Jul-93 | 05-Aug-93 | 20-Jul-93 |
| 10255 | Richter Supermarkt | Dodsworth, Anne | 09-Jul-93 | 06-Aug-93 | 12-Jul-93 |
| 10256 | Wellington Importadora | Filter By Selection | 12-Jul-93 | 09-Aug-93 | 14-Jul-93 |
| 10257 | HILARIÓN-Abastos | Filter Excluding Selection | 13-Jul-93 | 10-Aug-93 | 19-Jul-93 |
| 10258 | Ernst Handel | Remove Filter/Sort | 14-Jul-93 | 11-Aug-93 | 20-Jul-93 |
| 10259 | Centro comercial Moctezu | Sort Ascending | 15-Jul-93 | 12-Aug-93 | 22-Jul-93 |
| 10260 | Ottilies Käseladen | Sort Descending | 16-Jul-93 | 13-Aug-93 | 26-Jul-93 |
| 10261 | Que Delicia | Peacock, Margaret | 16-Jul-93 | 13-Aug-93 | 27-Jul-93 |
| 10262 | Rattlesnake Canyon Grocery | Callahan, Laura | 19-Jul-93 | 16-Aug-93 | 22-Jul-93 |
| 10263 | Ernst Handel | Dodsworth, Anne  800 | 20-Jul-93 | 17-Aug-93 | 28-Jul-93 |
| 10264 | Folk och fä HB | Suyama, Michael | 21-Jul-93 | 18-Aug-93 | 20-Aug-93 |
| 10265 | Blondel père et fils | Fuller, Andrew | 22-Jul-93 | 19-Aug-93 | 09-Aug-93 |
| 10266 | Wartian Herkku | Leverling, Janet | 23-Jul-93 | 03-Sep-93 | 28-Jul-93 |
| 10267 | Frankenversand | Peacock, Margaret | 26-Jul-93 | 23-Aug-93 | 03-Aug-93 |
| 10268 | GROSELLA-Restaurante | Callahan, Laura | 27-Jul-93 | 24-Aug-93 | 30-Jul-93 |
| 10269 | White Clover Markets | Buchanan, Steven | 28-Jul-93 | 11-Aug-93 | 06-Aug-93 |
| 10270 | Wartian Herkku | Davolio, Nancy | 29-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |

| Order ID | Customer | Employee | Order Date | Required Date | Shipped Date |
|---|---|---|---|---|---|
| 10248 | Vins et alcools Chevalier | Buchanan, Steven | 01-Jul-93 | 29-Jul-93 | 13-Jul-93 |
| 10255 | Richter Supermarkt | Dodsworth, Anne | 09-Jul-93 | 06-Aug-93 | 12-Jul-93 |
| 10258 | Ernst Handel | Davolio, Nancy | 14-Jul-93 | 11-Aug-93 | 20-Jul-93 |
| 10259 | Centro comercial Moctezuma | Peacock, Margaret | 15-Jul-93 | 12-Aug-93 | 22-Jul-93 |
| 10262 | Rattlesnake Canyon Grocery | Callahan, Laura | 19-Jul-93 | 16-Aug-93 | 22-Jul-93 |
| 10263 | Ernst Handel | Dodsworth, Anne | 20-Jul-93 | 17-Aug-93 | 28-Jul-93 |
| 10266 | Wartian Herkku | Leverling, Janet | 23-Jul-93 | 03-Sep-93 | 28-Jul-93 |
| 10267 | Frankenversand | Peacock, Margaret | 26-Jul-93 | 23-Aug-93 | 03-Aug-93 |
| 10269 | White Clover Markets | Buchanan, Steven | 28-Jul-93 | 11-Aug-93 | 06-Aug-93 |
| 10270 | Wartian Herkku | Davolio, Nancy | 29-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |
| 10274 | Vins et alcools Chevalier | Suyama, Michael | 03-Aug-93 | 31-Aug-93 | 13-Aug-93 |
| 10277 | Morgenstern Gesundkost | Fuller, Andrew | 06-Aug-93 | 03-Sep-93 | 10-Aug-93 |
| 10278 | Berglunds snabbkop | Callahan, Laura | 09-Aug-93 | 06-Sep-93 | 13-Aug-93 |
| 10280 | Berglunds snabbkop | Fuller, Andrew | 11-Aug-93 | 08-Sep-93 | 09-Sep-93 |
| 10281 | Romero y tomillo | Peacock, Margaret | 11-Aug-93 | 25-Sep-93 | 18-Aug-93 |
| 10282 | Romero y tomillo | Peacock, Margaret | 12-Aug-93 | 09-Sep-93 | 18-Aug-93 |
| 10283 | LILA-Supermercados | Leverling, Janet | 13-Aug-93 | 10-Sep-93 | 20-Aug-93 |
| 10289 | B's Beverages | King, Robert | 23-Aug-93 | 20-Sep-93 | 25-Aug-93 |
| 10292 | Tradicao Hipermercados | Davolio, Nancy | 25-Aug-93 | 22-Sep-93 | 30-Aug-93 |
| 10294 | Rattlesnake Canyon Grocery | Peacock, Margaret | 27-Aug-93 | 24-Sep-93 | 02-Sep-93 |
| 10295 | Vins et alcools Chevalier | Fuller, Andrew | 30-Aug-93 | 27-Sep-93 | 07-Sep-93 |
| 10296 | LILA-Supermercados | Suyama, Michael | 31-Aug-93 | 28-Sep-93 | 08-Sep-93 |

FIG. 16

| Order ID | Customer | Employee | Order Date | Required Date | Shipped Date |
|---|---|---|---|---|---|
| 10248 | Vins et alcools Chevalier | Buchanan, Steven | 01-Jul-93 | 29-Jul-93 | 13-Jul-93 |
| 10249 | Toms Spezialitäten | Suyama, Michael | 02-Jul-93 | 13-Aug-93 | 07-Jul-93 |
| 10250 | Hanari Carnes | Peacock, Margaret | 05-Jul-93 | 02-Aug-93 | 09-Jul-93 |
| 10251 | Victuailles en stock | Leverling, Janet | 05-Jul-93 | 02-Aug-93 | 12-Jul-93 |
| 10252 | Suprêmes délices | Peacock, Margaret | 06-Jul-93 | 03-Aug-93 | 08-Jul-93 |
| 10253 | Hanari Carnes | Leverling, Janet |  | 21-Jul-93 | 13-Jul-93 |
| 10254 | Chop-suey Chinese | Buchanan, Steven |  | 05-Aug-93 | 20-Jul-93 |
| 10255 | Richter Supermarkt | Dodsworth, Anne | Filter By Selection | 06-Aug-93 | 12-Jul-93 |
| 10256 | Wellington Importadora | Leverling, Janet | Filter Excluding Selection | 09-Aug-93 | 14-Jul-93 |
| 10257 | HILARIÓN-Abastos | Peacock, Margaret | Remove Filter/Sort | 10-Aug-93 | 19-Jul-93 |
| 10258 | Ernst Handel | Davolio, Nancy | Sort Ascending | 11-Aug-93 | 20-Jul-93 |
| 10259 | Centro comercial Moctezuma | Peacock, Margaret | Sort Descending | 12-Aug-93 | 22-Jul-93 |
| 10260 | Ottilies Käseladen | Peacock, Margaret | 15-Jul-93 | 13-Aug-93 | 26-Jul-93 |
| 10261 | Que Delícia | Peacock, Margaret | 16-Jul-93 | 13-Aug-93 | 27-Jul-93 |
| 10262 | Rattlesnake Canyon Grocery | Callahan, Laura | 16-Jul-93 | 16-Aug-93 | 22-Jul-93 |
| 10263 | Ernst Handel | Dodsworth, Anne | 19-Jul-93 | 17-Aug-93 | 28-Jul-93 |
| 10264 | Folk och fä HB | Suyama, Michael | 20-Jul-93 | 18-Aug-93 | 20-Aug-93 |
| 10265 | Blondel père et fils | Fuller, Andrew | 21-Jul-93 | 19-Aug-93 | 09-Aug-93 |
| 10266 | Wartian Herkku | Leverling, Janet | 22-Jul-93 | 03-Sep-93 | 28-Jul-93 |
| 10267 | Frankenversand | Peacock, Margaret | 23-Jul-93 | 23-Aug-93 | 03-Aug-93 |
| 10268 | GROSELLA-Restaurante | Callahan, Laura | 26-Jul-93 | 24-Aug-93 | 30-Jul-93 |
| 10269 | White Clover Markets | Buchanan, Steven | 27-Jul-93 | 11-Aug-93 | 06-Aug-93 |
| 10270 | Wartian Herkku | Davolio, Nancy | 28-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |

FIG. 17

| Order ID | Customer | Employee | Order Date | Required Date | Shipped Date |
|---|---|---|---|---|---|
| 10253 | Hanari Carnes | Leverling, Janet | 07-Jul-93 | 21-Jul-93 | 13-Jul-93 |
| 10903 | Hanari Carnes | Leverling, Janet | 02-Feb-95 | 21-Mar-95 | 01-Mar-95 |
| 10925 | Hanari Carnes | Leverling, Janet | 01-Mar-95 | 29-Mar-95 | 10-Mar-95 |
| 11052 | Hanari Carnes | Leverling, Janet | 24-Apr-95 | 22-May-95 | 28-Apr-95 |

FIG. 18

| Order ID | Customer | Employee | Order Date | Required Date | Shipped Date |
|---|---|---|---|---|---|
| 10248 | Vins et alcools Chevalier | Buchanan, Steven | 01-Jul-93 | 29-Jul-93 | 13-Jul-93 |
| 10249 | Toms Spezialitäten | Suyama, Michael | 02-Jul-93 | 13-Aug-93 | 07-Jul-93 |
| 10250 | Hanari Carnes | Peacock, Margaret | 05-Jul-93 | 02-Aug-93 | 09-Jul-93 |
| 10251 | Victuailles en stock | Leverling, Janet | 05-Jul-93 | 02-Aug-93 | 12-Jul-93 |
| 10252 | Suprêmes délices | Peacock, Margaret | | 03-Aug-93 | 08-Jul-93 |
| 10253 | Hanari Carnes | Leverling, Janet | | 21-Jul-93 | 13-Jul-93 |
| 10254 | Chop-suey Chinese | Buchanan, Steven | | 05-Aug-93 | 20-Jul-93 |
| 10255 | Richter Supermarkt | Dodsworth, Anne | | 06-Aug-93 | 12-Jul-93 |
| 10256 | Wellington Importadora | Leverling, Janet | | 09-Aug-93 | 14-Jul-93 |
| 10257 | HILARIÓN-Abastos | Peacock, Margaret | 13-Jul-93 | 10-Aug-93 | 19-Jul-93 |
| 10258 | Ernst Handel | Davolio, Nancy | 14-Jul-93 | 11-Aug-93 | 20-Jul-93 |
| 10259 | Centro comercial Moctezuma | Peacock, Margaret | 15-Jul-93 | 12-Aug-93 | 22-Jul-93 |
| 10260 | Ottilies Käseladen | Peacock, Margaret | 16-Jul-93 | 13-Aug-93 | 26-Jul-93 |
| 10261 | Que Delícia | Peacock, Margaret | 16-Jul-93 | 13-Aug-93 | 27-Jul-93 |
| 10262 | Rattlesnake Canyon Grocery | Callahan, Laura | 19-Jul-93 | 16-Aug-93 | 22-Jul-93 |
| 10263 | Ernst Handel | Dodsworth, Anne | 20-Jul-93 | 17-Aug-93 | 28-Jul-93 |
| 10264 | Folk och fä HB | Suyama, Michael | 21-Jul-93 | 18-Aug-93 | 20-Aug-93 |
| 10265 | Blondel père et fils | Fuller, Andrew | 22-Jul-93 | 19-Aug-93 | 09-Aug-93 |
| 10266 | Wartian Herkku | Leverling, Janet | 23-Jul-93 | 03-Sep-93 | 28-Jul-93 |
| 10267 | Frankenversand | Peacock, Margaret | 26-Jul-93 | 23-Aug-93 | 03-Aug-93 |
| 10268 | GROSELLA-Restaurante | Callahan, Laura | 27-Jul-93 | 24-Aug-93 | 30-Jul-93 |
| 10269 | White Clover Markets | Buchanan, Steven | 28-Jul-93 | 11-Aug-93 | 06-Aug-93 |
| 10270 | Wartian Herkku | Davolio, Nancy | 29-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |

Popup menu (800):
- Filter By Selection
- Filter Excluding Selection
- Remove Filter/Sort
- Sort Ascending
- Sort Descending

FIG. 19

| Order ID | Customer | Employee | Order Date | Required Date | Shipped Date |
|---|---|---|---|---|---|
| 10250 | Hanari Carnes | Peacock, Margaret | 05-Jul-93 | 02-Aug-93 | 09-Jul-93 |
| 10251 | Victuailles en stock | Leverling, Janet | 05-Jul-93 | 02-Aug-93 | 12-Jul-93 |
| 10252 | Suprêmes délices | Peacock, Margaret | 06-Jul-93 | 03-Aug-93 | 08-Jul-93 |
| 10253 | Hanari Carnes | Leverling, Janet | 07-Jul-93 | 21-Jul-93 | 13-Jul-93 |
| 10256 | Wellington Importadora | Leverling, Janet | 12-Jul-93 | 09-Aug-93 | 14-Jul-93 |
| 10257 | HILARIÓN-Abastos | Peacock, Margaret | 13-Jul-93 | 10-Aug-93 | 19-Jul-93 |
| 10259 | Centro comercial Moctezuma | Peacock, Margaret | 15-Jul-93 | 12-Aug-93 | 22-Jul-93 |
| 10260 | Ottilies Käseladen | Peacock, Margaret | 16-Jul-93 | 13-Aug-93 | 26-Jul-93 |
| 10261 | Que Delícia | Peacock, Margaret | 16-Jul-93 | 13-Aug-93 | 27-Jul-93 |
| 10266 | Wartian Herkku | Leverling, Janet | 23-Jul-93 | 03-Sep-93 | 28-Jul-93 |
| 10267 | Frankenversand | Peacock, Margaret | 26-Jul-93 | 23-Aug-93 | 03-Aug-93 |
| 10273 | QUICK-Stop | Leverling, Janet | 02-Aug-93 | 30-Aug-93 | 09-Aug-93 |
| 10281 | Romero y tomillo | Peacock, Margaret | 02-Aug-93 | 25-Aug-93 | 18-Aug-93 |
| 10282 | Romero y tomillo | Peacock, Margaret | 02-Aug-93 | 09-Sep-93 | 18-Aug-93 |
| 10283 | LILA-Supermercado | Leverling, Janet | 02-Aug-93 | 10-Sep-93 | 20-Aug-93 |
| 10284 | Lehmanns Marktstand | Peacock, Margaret | 02-Aug-93 | 13-Sep-93 | 24-Aug-93 |
| 10288 | Reggiani Caseifici | Peacock, Margaret | 02-Aug-93 | 17-Sep-93 | 31-Aug-93 |
| 10294 | Rattlesnake Canyon Grocery | Peacock, Margaret | 02-Aug-93 | 24-Sep-93 | 02-Sep-93 |
| 10299 | Ricardo Adocicados | Peacock, Margaret | 03-Sep-93 | 01-Oct-93 | 10-Sep-93 |
| 10302 | Suprêmes délices | Peacock, Margaret | 07-Sep-93 | 05-Oct-93 | 06-Oct-93 |
| 10309 | Hungry Owl All-Night Grocers | Leverling, Janet | 16-Sep-93 | 14-Oct-93 | 20-Oct-93 |
| 10315 | Island Trading | Peacock, Margaret | 23-Sep-93 | 21-Oct-93 | 30-Sep-93 |
| 10321 | Island Trading | Leverling, Janet | 30-Sep-93 | 28-Oct-93 | 08-Oct-93 |
| 10323 | Königlich Essen | Peacock, Margaret | 04-Oct-93 | 01-Nov-93 | 11-Oct-93 |
| 10326 | Bolido Comidas preparadas | Peacock, Margaret | 07-Oct-93 | 04-Nov-93 | 11-Oct-93 |

FIG. 20

| Order ID | Customer | Employee | Order Date | Required Date | Shipped Date |
|---|---|---|---|---|---|
| 10248 | Vins et alcools Chevalier | Buchanan, Steven | 01-Jul-93 | 29-Jul-93 | 13-Jul-93 |
| 10249 | Toms Spezialitäten | Suyama, Michael | 02-Jul-93 | 13-Aug-93 | 07-Jul-93 |
| 10250 | Hanari Carnes | Peacock, Margaret | 05-Jul-93 | 02-Aug-93 | 09-Jul-93 |
| 10251 | Victuailles en stock | Leverling, Janet | | 02-Aug-93 | 12-Jul-93 |
| 10252 | Suprêmes délices | Peacock, Margaret | Filter By Selection | 03-Aug-93 | 08-Jul-93 |
| 10253 | Hanari Carnes | Leverling, Janet | Filter Excluding Selection | 21-Jul-93 | 13-Jul-93 |
| 10254 | Chop-suey Chinese | Buchanan, Steven | Remove Filter/Sort | 05-Aug-93 | 20-Jul-93 |
| 10255 | Richter Supermarkt | Dodsworth, Anne | Sort Ascending | 06-Aug-93 | 12-Jul-93 |
| 10256 | Wellington Importadora | Leverling, Janet | Sort Descending | 09-Aug-93 | 14-Jul-93 |
| 10257 | HILARIÓN-Abastos | Peacock, Margaret | 13-Jul-93 | 10-Aug-93 | 19-Jul-93 |
| 10258 | Ernst Handel | Davolio, Nancy | 14-Jul-93 | 11-Aug-93 | 20-Jul-93 |
| 10259 | Centro comercial Moctezuma | Peacock, Margaret | 15-Jul-93 | 12-Aug-93 | 22-Jul-93 |
| 10260 | Ottilies Käseladen | Peacock, Margaret | 16-Jul-93 | 13-Aug-93 | 26-Jul-93 |
| 10261 | Que Delícia | Peacock, Margaret | 16-Jul-93 | 13-Aug-93 | 27-Jul-93 |
| 10262 | Rattlesnake Canyon Grocery | Callahan, Laura | 19-Jul-93 | 16-Aug-93 | 22-Jul-93 |
| 10263 | Ernst Handel | Dodsworth, Anne | 20-Jul-93 | 17-Aug-93 | 28-Jul-93 |
| 10264 | Folk och fä HB | Suyama, Michael | 21-Jul-93 | 18-Aug-93 | 20-Aug-93 |
| 10265 | Blondel père et fils | Fuller, Andrew | 22-Jul-93 | 19-Aug-93 | 09-Aug-93 |
| 10266 | Wartian Herkku | Leverling, Janet | 23-Jul-93 | 03-Sep-93 | 28-Jul-93 |
| 10267 | Frankenversand | Peacock, Margaret | 26-Jul-93 | 23-Aug-93 | 03-Aug-93 |
| 10268 | GROSELLA-Restaurante | Callahan, Laura | 27-Jul-93 | 24-Aug-93 | 30-Jul-93 |
| 10269 | White Clover Markets | Buchanan, Steven | 28-Jul-93 | 11-Aug-93 | 06-Aug-93 |
| 10270 | Wartian Herkku | Davolio, Nancy | 29-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |

| Order ID | Customer | Employee | Order Date | Required Date | Shipped Date |
|---|---|---|---|---|---|
| 10248 | Vins et alcools Chevalier | Buchanan, Steven | 01-Jul-93 | 29-Jul-93 | 13-Jul-93 |
| 10249 | Toms Spezialitäten | Suyama, Michael | | Filter By Selection | |
| 10250 | Hanari Carnes | Peacock, Margaret | | Filter Excluding Selection | |
| 10251 | Victuailles en stock | Leverling, Janet | 05-Jul-93 | Remove Filter/Sort | |
| 10252 | Suprêmes délices | Peacock, Margaret | 06-Jul-93 | Sort Ascending | |
| 10253 | Hanari Carnes | Leverling, Janet | 07-Jul-93 | Sort Descending | |
| 10254 | Chop-suey Chinese | Buchanan, Steven | 08-Jul-93 | | |
| 10255 | Richter Supermarkt | Dodsworth, Anne | 09-Jul-93 | Ig-93 | 12-Jul-93 |
| 10256 | Wellington Importadora | Leverling, Janet | 12-Jul-93 | Ig-93 | 14-Jul-93 |
| 10257 | HILARIÓN-Abastos | Peacock, Margaret | 13-Jul-93 | 10-Aug-93 | 19-Jul-93 |
| 10258 | Ernst Handel | Davolio, Nancy | 14-Jul-93 | 11-Aug-93 | 20-Jul-93 |
| 10259 | Centro comercial Moctezuma | Peacock, Margaret | 15-Jul-93 | 12-Aug-93 | 22-Jul-93 |
| 10260 | Ottilies Käseladen | Peacock, Margaret | 16-Jul-93 | 13-Aug-93 | 26-Jul-93 |
| 10261 | Que Delícia | Peacock, Margaret | 16-Jul-93 | 13-Aug-93 | 27-Jul-93 |
| 10262 | Rattlesnake Canyon Grocery | Callahan, Laura | 19-Jul-93 | 16-Aug-93 | 22-Jul-93 |
| 10263 | Ernst Handel | Dodsworth, Anne | 20-Jul-93 | 17-Aug-93 | 28-Jul-93 |
| 10264 | Folk och fä HB | Suyama, Michael | 21-Jul-93 | 18-Aug-93 | 20-Aug-93 |
| 10265 | Blondel père et fils | Fuller, Andrew | 22-Jul-93 | 19-Aug-93 | 09-Aug-93 |
| 10266 | Wartian Herkku | Leverling, Janet | 23-Jul-93 | 03-Sep-93 | 28-Jul-93 |
| 10267 | Frankenversand | Peacock, Margaret | 26-Jul-93 | 23-Aug-93 | 03-Aug-93 |
| 10268 | GROSELLA-Restaurante | Callahan, Laura | 27-Jul-93 | 24-Aug-93 | 30-Jul-93 |
| 10269 | White Clover Markets | Buchanan, Steven | 28-Jul-93 | 11-Aug-93 | 06-Aug-93 |
| 10270 | Wartian Herkku | Davolio, Nancy | 29-Jul-93 | 26-Aug-93 | 30-Jul-93 |
| 10271 | Split Rail Beer & Ale | Suyama, Michael | 29-Jul-93 | 26-Aug-93 | 27-Aug-93 |
| 10272 | Rattlesnake Canyon Grocery | Suyama, Michael | 30-Jul-93 | 27-Aug-93 | 03-Aug-93 |

1

METHOD AND APPARATUS FOR DATABASE FILTER GENERATION BY DISPLAY SELECTION

FIELD OF THE INVENTION

This invention relates to the filtering (querying) of data in a database management system. In particular, the present invention relates to generation of database commands to filter of select particular records in a displayed database table by graphical user selection of displayed records like the desired records.

PROBLEM

Computer database management systems provide structured storage of data to permit rapid, flexible access to the data through database queries. Query commands directed to a database management system (particularly a relational database management system) consist essentially of commands which identify a particular table from which records (rows) which match a particular selection criteria are to be extracted. A common command language for such database querying is the Structured Query Language (SQL) widely used in industry and adopted as ANSI (?) standard 123456.

SQL permits a user to construct queries in the English-like SQL language syntax. The query may then be applied by the user, for example, to filter the records presented on the computer's display. The SQL "SELECT" command is typically used to selectively retrieve records from tables of a stored database. Clauses of the "SELECT" command identify the table(s) from which records (rows) are to be retrieved, the column(s) of the retrieved rows which are to be used in forming a resultant table, and the boolean conditions to be met by rows which qualify for retrieval.

Despite the English-like command syntax of SQL (and other similar query command languages), it remains a difficult problem for non-expert users to construct a query/filter to retrieve a particular desired set of records. Some prior solutions have attempted to provide a "front-end" (often graphical) user interface hiding the details of the SQL syntax from the user to thereby permit easier construction of query commands by a user. However, these prior approaches are usually devoid of any context for stored data (i.e., the actual data is not presented to the user during the construction of the query as an aid in query construction).

There are several difficulties inherent in the construction of queries in accordance with present techniques. For example, a user must be cognizant of the stored formats of particular columns in the records to be retrieved as compared to the textual format typically presented to a user viewing records of the database. A date field, for example, is frequently re-formatted into a common format for presentation to a user whereas the physically stored value representing the date is typically a binary format optimized for reduced storage space requirements. In accordance with prior techniques, a user must include appropriate conversion functions within the SQL commands to compare a stored date field in native (binary) format with a typical textual representation of the desired date for selection and retrieval of records. Or, for example, it may be desirable to compare a field with a desired value by forming a relation with another table. An employee identification, for example, may be stored in a table as a "foreign" key (a primary key in another table). The value may be stored in a first table as an employee ID number for reduced storage requirements and for normalization requirements. The employee name associated with an ID would typically be stored in an independent second table. To form a query retrieving records in the first table using an employee name comparison requires formation of a join based upon the relation between the first and second tables using the shared ID key field. In accordance with prior techniques, a user must include any required joins in the query command construction.

It is apparent from the above discussion that a need exists for an improved method for automatically generating selection/filtration commands in a database management system which is easily directed by input of a non-expert user.

SOLUTION

The present invention solves the above and other problems, to thereby advance the useful arts, by providing a method which permits a user to construct a query (also referred to herein as a filter) with a simple graphical user interface. Currently selected records (initially the entire set of records in a table or pre-existing query) are presented to the user in tabular form (or in other formatted display forms) on the display screen of the user's computer system. The presently selected and displayed records may be the entirety of a database table or a particular pre-existing query or view of a database table. The presently displayed and selected records may also be referred to as a "record set" or "record source" to suggest the generality of collection of records. The table of selected records (when displayed in tabular form) comprises a number of rows (records) and columns. Each intersection of a row with a column is also referred to herein as a "cell." When the record set is displayed in non-tabular form, a "cell" corresponds to the area of the display screen in which the data is displayed. Methods of the present invention are operable regardless of the tabular or non-tabular format of data displayed on the user's display screen. The methods of the present invention await a user's indication that a new filter is to be constructed in which the selected records share common values with values highlighted (selected) in one or more displayed cells. In other words, through use of a keyboard and/or pointing device (e.g., mouse), the user highlights particular displayed values in the cells presently displayed on the user's computer display screen. The user then indicates that the methods of the present invention are to automatically construct a query (filter) which selects records from the displayed table where the selected records are to be "LIKE" the highlighted cell(s). The generated query (filter) is then applied to the records of the displayed table, all qualifying records are retrieved as required, and the resultant table (the selected records) are presented on the user's computer display.

In particular, the methods of the present invention interpret the user's highlighting within a cell to generate a particular boolean comparison clause in the select (filter) command. In response to the highlighting by a user of a starting portion of the value in the cell (e.g., highlighting at least the first character in the cell but not the entire cell), the boolean comparison clause of the generated filter command will select rows where the corresponding column starts with the highlighted text followed by any number of additional characters. In response to the highlighting by a user of an ending portion of the value in the cell (e.g., highlighting at least the last character in the cell but not the entire cell), the boolean comparison clause of the generated filter command will select rows where the corresponding column ends with the highlighted text preceded by any number of additional characters. In response to a user highlighting a middle portion of the value in a cell (e.g., the highlighting includes any number of characters in the cell but excludes the first and last character of the cell), the boolean comparison clause of the generated filter command will select rows where the corresponding column contains the highlighted text preceded or followed by any number of additional characters. A user's highlighting of an entire cell value generates a boolean comparison clause in the generated filter command which will select rows where the corresponding column contains the exactly the highlighted text. A user request to generate a filter in accordance with a selection when no characters are highlighted in a cell generates a boolean comparison of the entire value of the cell in which the cursor is presently located.

Additional methods of the present invention automatically include any required reformatting clauses in the generated filter command which may be required to compare the highlighted cell value with the stored value in the relevant column of the table's records. Still other methods of the present invention generate any "inner join" clauses required to compare the highlighted cell value to the stored values in a related table by use of a common key value underlying the displayed column values.

Selection of values in a plurality of rows and columns causes the methods of the present invention to generate boolean "OR" and "AND" clauses to join the various boolean comparison clauses generated. In particular, all cell values highlighted within a single displayed row of the table cause the methods of the present invention to generate boolean "AND" clauses to combine the boolean comparison clauses generated by the highlighted cells in a row. Highlighting of values in a plurality of rows causes the methods of the present invention to logically "OR" the comparison clauses generated for each row. In addition, the user may indicate that the highlighted cells are intended to include matching records (also referred to herein as filter by selection) or to exclude matching records (also referred to herein as filter excluding selection). Lastly, a newly generated select (filter) command may be logically "AND'd" with a previously defined filter or may replace a previously defined filter. These features permit a user to generate complex logical expression of the selection criteria for the required filter by repetitive combination of comparison clauses generated using boolean "NOT", "OR", and "AND" operations.

These methods of the present invention provide an easy to use graphical user interface for the ad-hoc generation and application of complex filter (select) commands in a database management system.

BRIEF DESCRIPTION OF THE DRAWINGS

FIGS. 6–21 are exemplary screen images as presented on the display screen of the computer system of FIG. 1 typifying operation of the methods of the present invention.

DETAILED DESCRIPTION OF THE INVENTION

Figure 1:
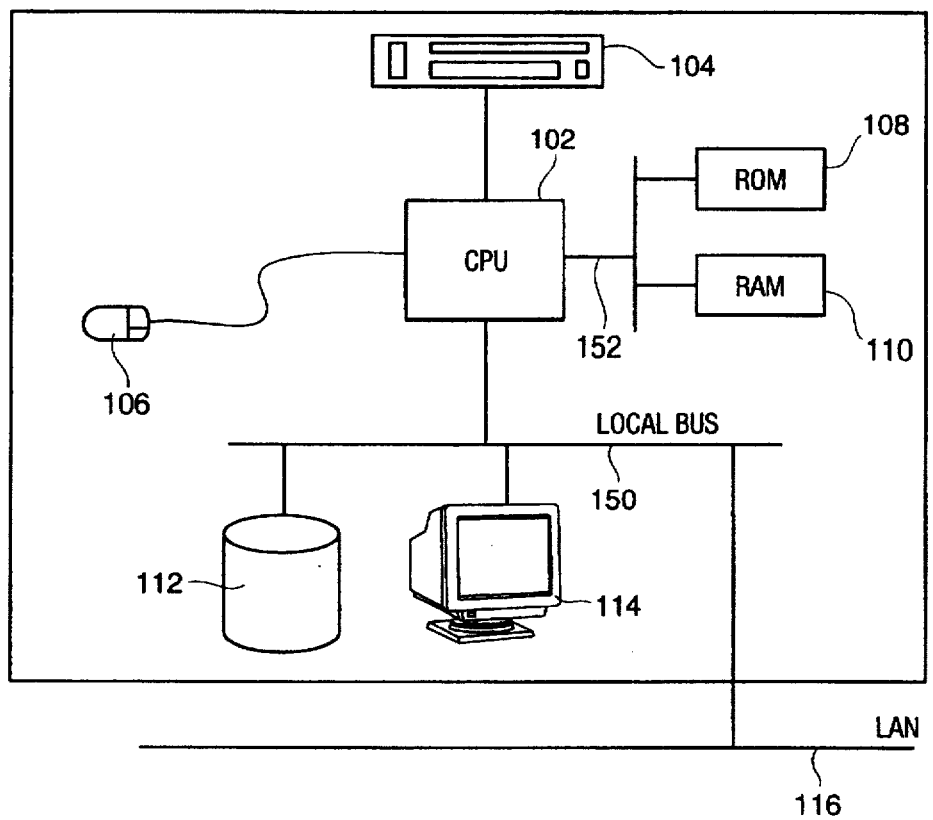
FIG. 1 is a block diagram of a computing system in which the methods of the present invention may be advantageously applied.

Computing Environment Overview:

The methods of the present invention are useable in any of several standard computing systems generally available in the industry. FIG. 1 depicts a typical computing system 100 in which the methods and structures of the present invention may be advantageously applied. The methods of the present invention are performed by execution of programmed instructions within the CPU 102. CPU 102 stores and/or retrieves programmed instructions and/or data from ROM 108 and RAM 110 via memory bus 152. The methods of the present invention operable within CPU 102 receive user input via keyboard 104 and pointing device 106. Various peripheral I/O devices are attached to CPU 102 via local bus 150. Specifically, mass storage device 112 (i.e. disk storage devices), graphical display 114, and local area network (LAN) 116 are all attached to CPU 102 via local bus 150.

The methods of the present invention operable within CPU 102 manipulate information in a database stored within mass storage device 112 and display resultant information on graphical display 114. User input directing the methods of the present invention to select particular cells (rows and columns) of the database table are received via keyboard 104 and pointing device 106. One of ordinary skill in the art will readily recognize that the methods of the present invention are equally applicable where, for example, a database being manipulated is stored remotely and is accessible via LAN 116 using well known distributed computing and network communication techniques. More generally, one of ordinary skill in the art will readily recognize that LAN 116 may represent any computer network communication subsystem in which a database may be remotely accessed by another computer. Similarly, user input obtained via pointing device 106 or keyboard 104 may be similarly generated by other user input devices and techniques such as so-called pop-up or pull-down menu graphical user interface operations.

Methods of the Present Invention—Overview:

The methods of the present invention are depicted in the flowcharts of FIGS. 2–5. The flowcharts describing the methods of the present invention are described below in conjunction with FIGS. 6–21 which display exemplary screen images as presented to the user by CPU 102 through graphical display 114 of FIG. 1. Each of FIGS. 6–21 present an exemplary database table comprising a plurality of rows and columns. Each column is labeled at the top to indicate the semantic meaning of values displayed below in the corresponding column. Each row in the displayed table represents an entry in the database tables stored within the mass storage device 112 of the computing system 100. In particular, FIG. 6 depicts exemplary data from a table associated with a typical order entry database application. Each record (i.e., entry or row) is comprised of a stored value corresponding to each of the identified columns. As shown in FIG. 6, the exemplary database has six columns labeled and referenced as: Order ID 600, Customer 602, Employee 604, Order Date 606, Required Date 608, and Shipped Date 610. As depicted in FIGS. 6–21, only a small portion of the actual records (rows) and columns contained in the exemplary database table are shown. Only a portion of the exemplary database is shown in order to discuss the operation of the methods of the present invention. One of ordinary skill in the art will readily recognize that the exemplary data shown in the screen displays of FIGS. 6–21 is intended only to suggest the operations of the methods of the present invention. Therefore certain aspects of the displayed data may appear incomplete or inconsistent as compared to actual data corresponding to an actual application database.

Figure 5:
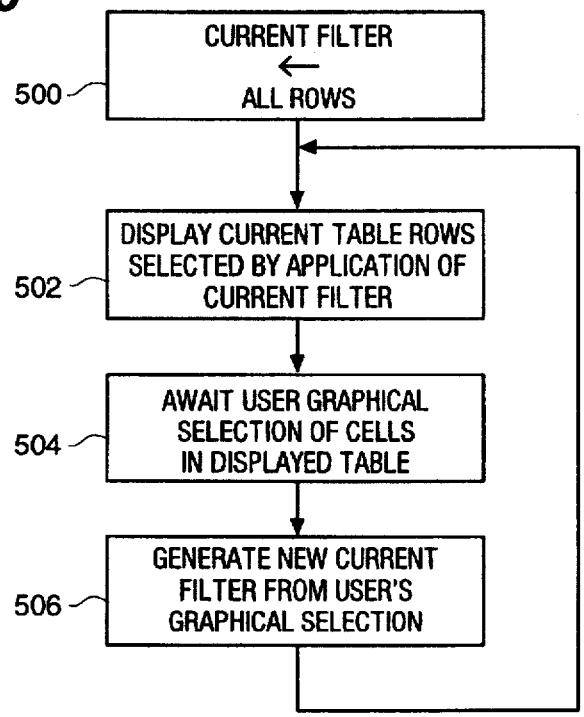
FIGS. 2–5 are flowcharts describing the methods of the present invention operable within the computing system of FIG. 1.

FIG. 5 describes at a high level the method of the present invention. The method depicted by the flowchart of FIG. 5 is operable within CPU 102 of FIG. 1 to permit the user of the computing system 100 to easily select data in a table currently displayed on graphical display 114 to generate a filter for viewing related records. Element 500 of FIG. 5 is first operable to indicate that the current filter is initialized to display all rows in a desired table. Element 502 is then operable to display the currently selected table as filtered by application of the current filter. As used herein, the term "filter" refers to a user-supplied specification which selects particular rows in the desired database table for display while excluding other rows from the display based upon the content of one or more columns in the various rows. The filter therefore, specifies a comparative value to be applied in a boolean comparison with the associated column values of each row in the currently displayed table to determine which rows of the table shall be displayed following application of the newly specified user filter. A filter therefore, may contain any specification which compares column values within rows of a database table with a user-selected value. The comparison may include similarity or equality as well as other boolean comparison operations. Element 504 is next operable to await the selection of particular cells in the display table through corresponding user input obtained via pointing device 106 or keyboard 104 of computing system 100 of FIG. 1. The user is said to graphically select a cell in the display table by highlighting a portion of an entry (cell) in the display table.

FIG. 7 depicts the same table as shown in FIG. 6 with an entry in the seventh row highlighted. Specifically, the Customer column 602 value of the seventh row is selected and highlighted (i.e. the row having an Order ID column 600 value of "10254"). The highlighted Customer column 602 value is "Chop-suey Chinese." As shown in FIG. 7, the highlighted field is indicated by the reverse video highlighting of the selection indicated by reference number 700.

Following highlighting of a desired cell in the displayed table as shown in FIG. 7, element 504 of FIG. 5 is further operable to await the user's indication that the selected cell (highlighted cell 700) is to be used in construction of a user-defined filter to select similar records-from the displayed table. Through user input obtained via pointing device 106 (e.g., such as "right clicking" a mouse button or by selecting pull-down menu commands), or via keyboard 104 input (e.g., function key or other keystroke input), the user indicates by use of pop-up menu 800 that the highlighted selected cell 700 is to be used in construction of a filter by selection. One of ordinary skill in the art will readily recognize that this indication by the user may be by any of several well known user input techniques including pointer device 106, and keyboard 104 to indicate the user's desire to construct a filter. Pop-up menu 800 is but one common approach for obtaining the desired user input.

Element 506 is then operable in response to the user's indication that a user-defined filter specification is to be constructed using the data in the highlighted selected cell 700. The user-defined filter specification (the highlighted selected cell 700) is used to generate a new current filter for selection of similar records from the displayed table. Processing then continues by looping back to element 502 to display selected rows from the current table by application of the newly specified current filter.

FIG. 9 depicts the table displayed by operation of element 502 following application of the newly defined current filter selected and generated by operation of elements 504-506. As can be seen in FIG. 9, all displayed rows contain a Customer column 602 field value equal to the highlighted selected cell 700 of FIG. 7. As is shown in FIG. 5, the process may continue by generating further filtration commands in combination with previously generated user-selected filters. Each newly generated filter command in accordance with a user selected cell value may be logically combined (i.e., AND'd) with a previously defined filter to permit generation of more complex filter sequences. One of ordinary skill in the art will readily recognize that subsequent filter selection and generation may be combined with a previous filter selection or a newly defined filter selection may replace the previously defined filter selection. Such a design choice is determined by the degree of flexibility to be offered the user.

Figure 2:
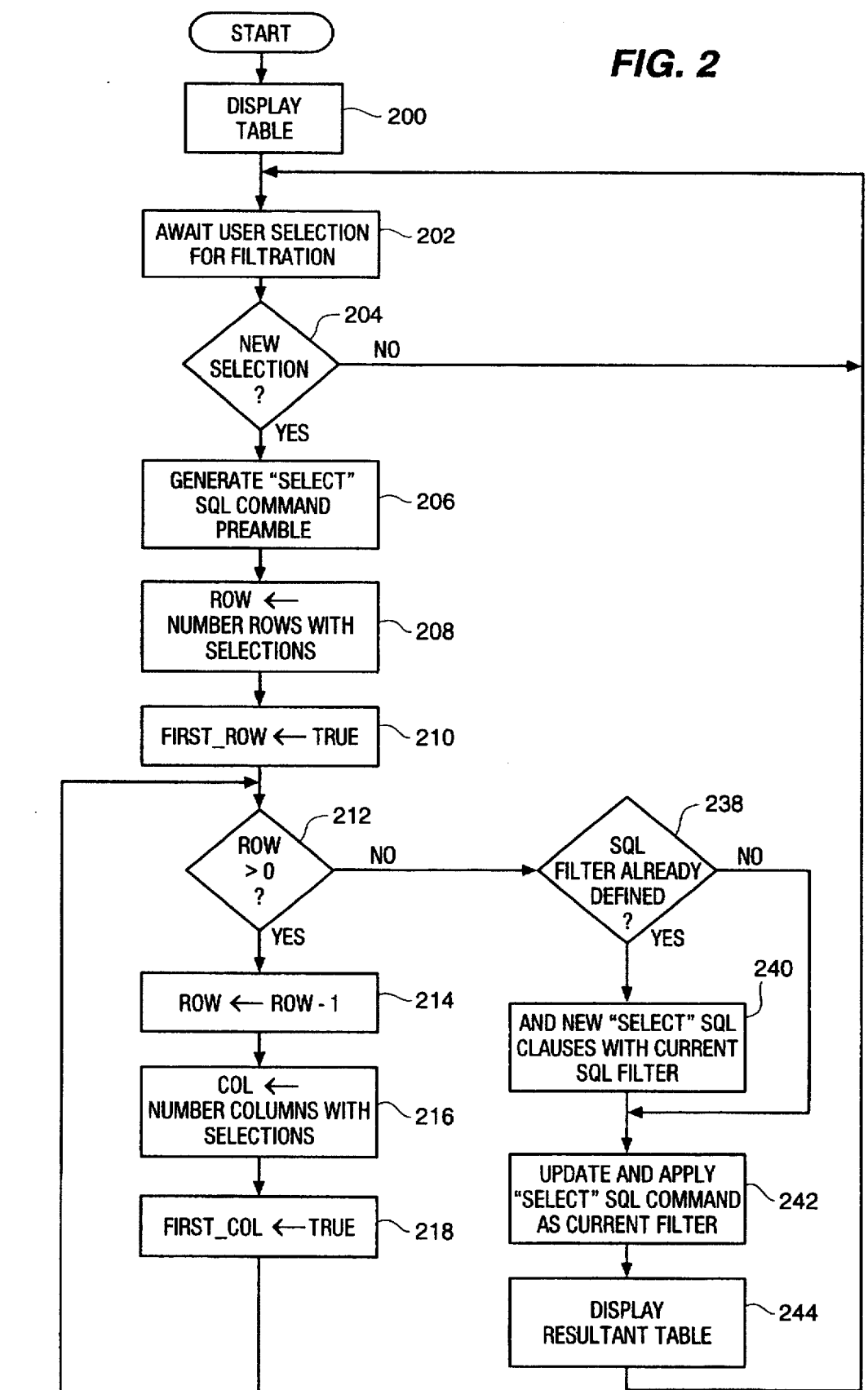
Figure 3:
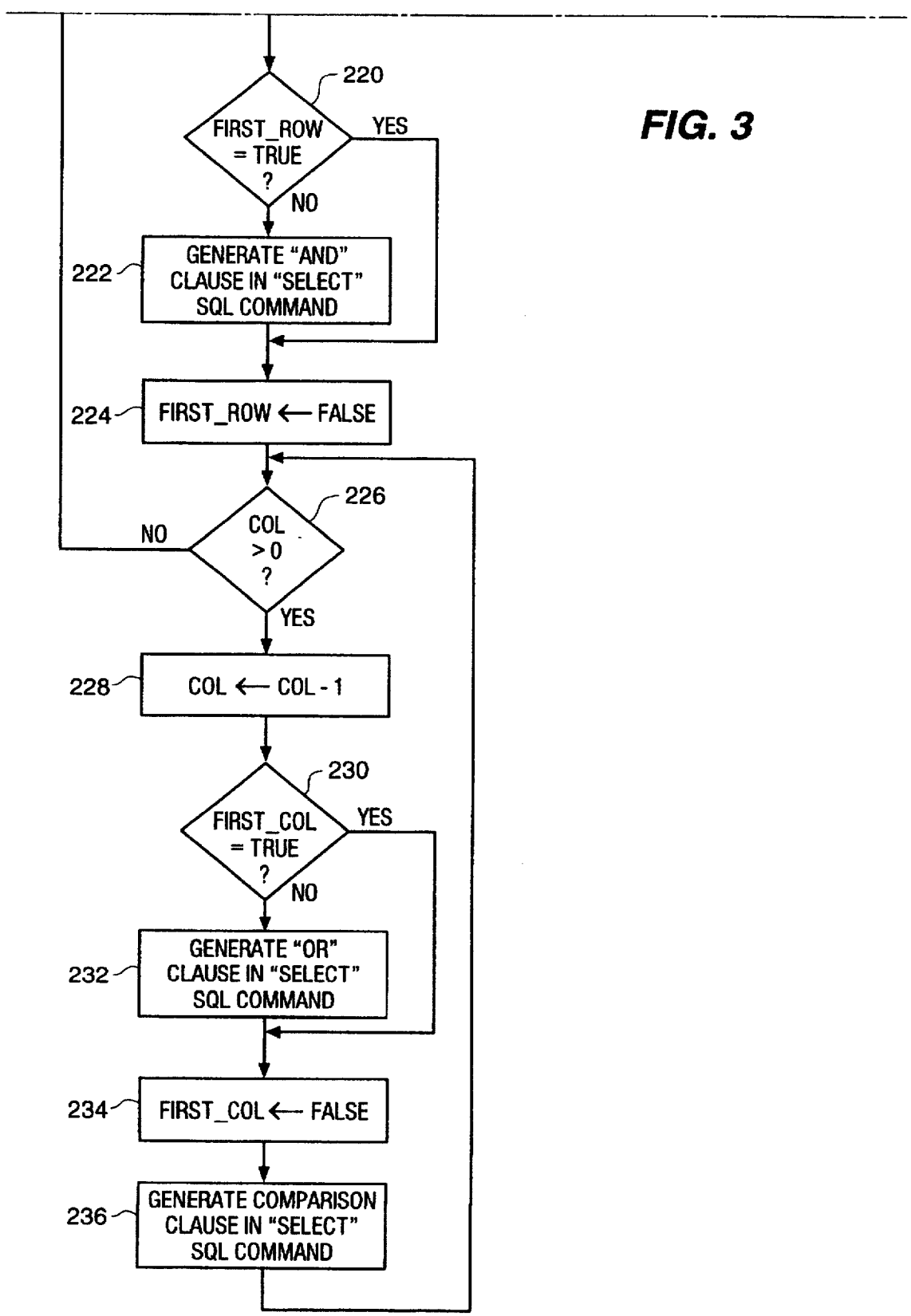
Figure 4:
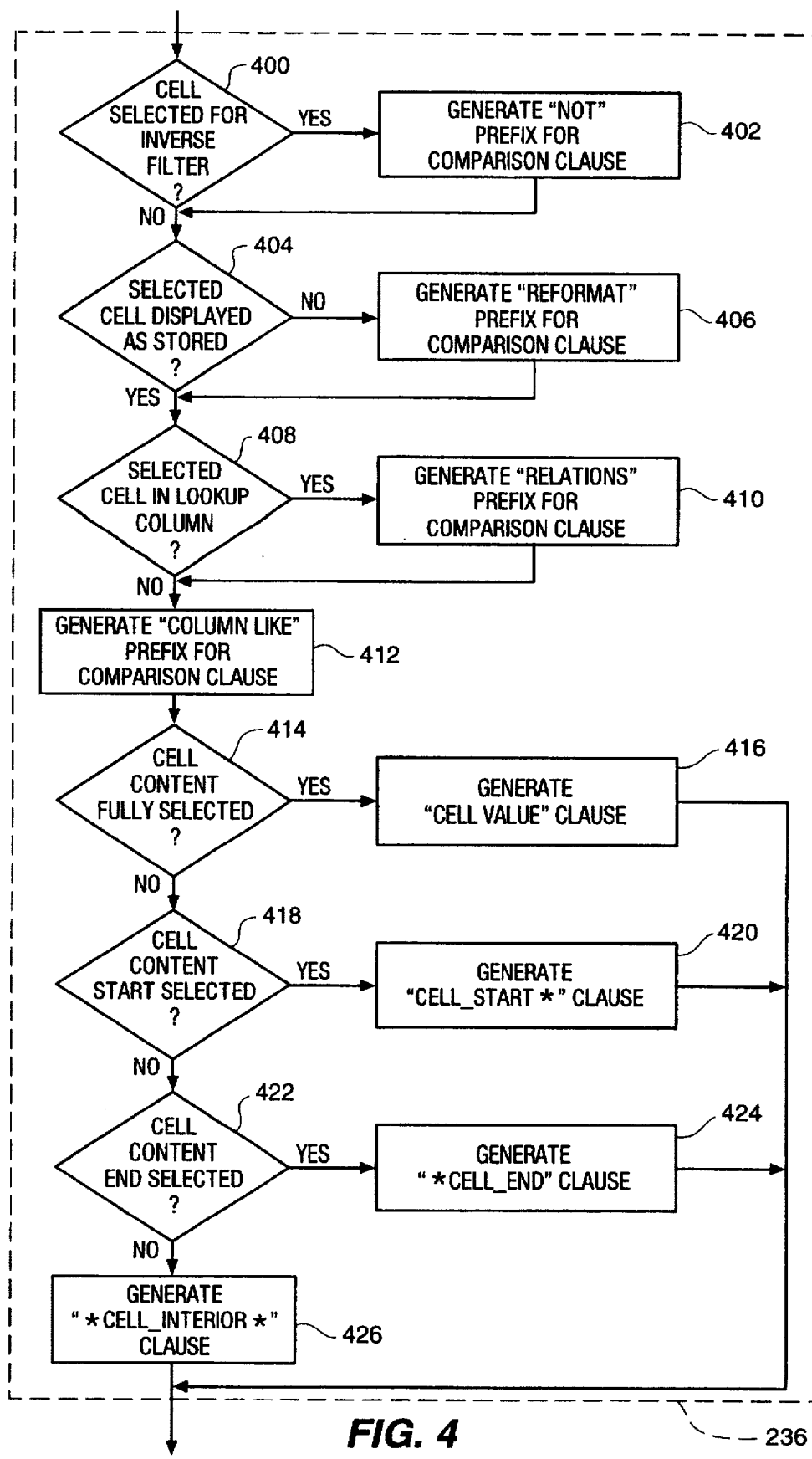

Methods of the Present Invention—Additional Detail:

FIGS. 2–4 are flowcharts describing additional detail of the methods of the present invention described above generally with respect to FIG. 5. A first flowchart begins on FIG. 2 and continues onto FIG. 3. FIG. 4 is a flowchart which provides additional detail of the operation of element 236 of FIG. 3.

Element 200 of FIG. 2 begins by displaying a desired database table having rows selected by application of a currently defined filter. As noted above with respect to FIG. 5, the currently defined filter may be initialized to a null filter to thereby initially select all rows of the desired table for display. Subsequent filter selection and generation by the user may modify the table displayed as discussed below. Element 202 is next operable to await user input defining a selection within a displayed table to be used in generation of a new current filter. As noted above generally with respect to FIG. 5, user input obtained via pointing device 106 or keyboard 104 may be used to define a selection of cells within the displayed database table which the user may utilize in construction of a new current filter. One of ordinary skill in the art will readily recognize one common technique for such selection is by use of a pointer device to point at a desired starting position for selection, click and hold a switch on the pointer device (i.e., a mouse button), drag the pointer device to the ending point of the desired selection, and release of the held switch. This process selects all displayed information on the screen from the starting position through the ending position as a selected cell. Typically, as shown in FIGS. 6–21, the selected cell is highlighted using color or reverse video displays to indicate the current selected cell.

Element 204 next determines whether the graphical selection entered by the user actually defines a new, valid cell selection for generation of a new current filter. For example, the user must select a cell which includes at least one row in at least one column (or portions thereof). If the user's selection is in some way invalid (e.g., selecting no rows or columns in the displayed table, then processing continues by looping back to element 202 awaiting valid selection by the user.

Elements 206–240 are next operable to generate an SQL "SELECT" command to be applied to the rows of displayed table thereby filtering the table entries for updated display purposes. One of ordinary skill in the art will readily recognize that the methods and structures of the present invention may be utilized to construct any form of database query or filtration commands as appropriate to the command language structure of the underlying database engine. SQL command syntax is but one example of such a command language. Element 206 is therefore operable to generate a static starting portion of the SELECT command, namely the preamble portion specifying that all columns are to be selected from the displayed table. The comparison clauses of the SELECT command which qualify records to be retrieved from the displayed table are generated by subsequent elements of the method.

Element 208 is next operable to set a local variable named ROW equal to the number of rows contained within the user's selected cells. Element 210 is operable to set a local variable named FIRST_ROW to TRUE to indicate that the first row of the user's selected rows is about to be processed. Elements 212–236 are next operable to process each column of each row in the user's selected cells.

Element 212 is first operable to determine if further rows remain to be processed by determining that the local variable ROW is greater than zero. If ROW is less than or equal to zero, processing continues with element 238 to complete the generation and application of the newly defined current filter. If ROW is greater than zero, indicating further rows remain to be processed within the user's selected cells, processing continues with element 214 to decrement the variable ROW by one. Element 216 is then operable to set a local variable named COL equal to the number of columns within the user's selected cells. Element 218 sets a local variable named FIRST_COL to a value of TRUE to indicate that the first column of the row presently being processed is about to be processed. Processing then continues with element 220 on FIG. 3.

In advance of processing the elements in each column of the current row being processed, element 220 is operable to determine whether the row being processed is the first row to be processed within the repetitive execution of elements 212–236 or a later row. If the FIRST_ROW local variable is TRUE, processing continues at element 224. Otherwise, element 222 is operable to generate a "AND" clause in the select SQL command being generated as current filter. In either case, element 224 is next operable to reset the FIRST_ROW local variable to a value of FALSE indicating that the first row of the user's selected cells has been processed. Elements 226–236 are next operable repetitively for each column in the row currently being processed within the user's selected cells.

Element 226 is operable to determine whether additional columns remain to be processed in the row of the users selected cells currently being processed. If no further columns remain to be processed in the current row, processing continues by looping back to element 212 of FIG. 2 to determine whether additional rows remain to be processed. Otherwise, element 228 is operable to decrement the local variable COL by one. Element 230 is next operable to determine whether the column currently being processed within the current row of the user's selected cells is the first such column to be processed within the row. If the FIRST_COL local variable is TRUE, processing continues with element 234. Otherwise, element 232 is next operable to generate a "OR" clause within the select SQL command being generated as the current filter. In either case, element 234 is operable to reset the FIRST_COL local variable to a value of FALSE.

Element 236 then generates the comparison clause within the select SQL command appropriate to compare the particular cell at the currently processed row and column with the related column in all rows of the currently displayed table. The comparison clause utilizes the SQL "LIKE" comparison operator to compare the selected cell value against the corresponding column value in each row processed by the SELECT command filter. Processing then continues by looping back to element 226 to determine if further rows remain to be processed.

Elements 212–236 of FIGS. 2 and 3, described above, therefore implement a doubly nested looping construct to process each cell of each row of the user's selected cells.

Comparison clauses are generated by operation of element 236 for each selected (highlighted) cell in each row. The generated comparison clauses for all selected cells within a single row are logically combined by boolean AND operations to form a logical predicate representing the qualifications of records to be selected by the generated SELECT command. The logical predicates so constructed for each row are logically combined by boolean OR operations to form the complete predicate for the generated SELECT command.

Once all cells within all rows of the user's selected cells have been processed by elements 212–236, a new select SQL command is thereby generated for use in conjunction with the current filter. Element 238 is next operable whether another select SQL command has already been defined as the current filter. If no other SELECT command is presently defined as the current filter, processing continues with element 242. Otherwise, element 240 is operable to combine the newly generated SQL SELECT command clauses with the SQL SELECT command presently defined as the current filter. The combined clauses may then be utilized as the current filter. In this manner, the user may generate complex SQL filter command sequences by repetitively selecting cells to define SQL filtration for combination of previously defined SQL filters.

Element 242 is then operable to store the generated SQL SELECT command as the current filter for the displayed database table. The SELECT command so generated is then applied to the database table presently displayed on the user's graphical display screen 114 and the results of the SQL SELECT command are then displayed by operation of element 244 on the user's graphical display screen 114. Processing then continues by looping back to element 202 to await further user selected cells for generation of SQL filter commands.

CELL SELECTION EXAMPLES

Selection of cells under the methods of the present invention may include selection of the entire contents of a cell, a beginning portion of the contents of a cell, a middle portion of the contents of a cell, an ending portion of the contents of a cell, and combinations of multiple such selections over a plurality of columns and/or rows of the database table presently displayed. Each type of cell selection is interpreted by the methods of the present invention to generate different comparison clauses in the generated SQL SELECT command. This flexibility permits a wide variety of selections by the user for the generation of complex filters through a simple graphical user interface. FIGS. 10 and 11 are exemplary table displays on graphical display 114 of FIG. 1 depicting the selection of a start of a cell by user for generation of an SQL select filter. FIGS. 12–13 are exemplary table displays depicting a user selecting the ending portion of a cell for generation of a filter. FIGS. 14–15 are exemplary screen displays associated with selecting a middle portion of a cell selected by a user for filter generation. FIGS. 16–19 are exemplary screen displays for a user selecting a plurality of columns or a plurality of rows in the generation of an SQL filter.

FIG. 10 shows an exemplary screen display with the table first shown in FIG. 6 having the third row with a highlighted beginning portion of a cell in the Customer column 602 of a row. Reference number 1000 indicates the selected starting "H" highlighted in inverse video on the screen display to call attention to its selection by the user. Pop up menu 800, as noted above, indicates that the user has highlighted the cell for purposes of filter generation by the selection (e.g., Filter by Selection). FIG. 11 depicts the resultant table displayed on graphical display 114 of FIG. 1 as a result of generation and application of the filter command corresponding to the user's cell selection of FIG. 10. All rows displayed in the table in FIG. 11 have a Customer column 602 field value which begins with an "H" as indicated by the user's selection of FIG. 10.

FIGS. 12–13 similarly depict operation of the methods of the present invention for an ending portion of a cell selection. As shown in FIG. 12, reference number 1200 indicates a reverse video user selection for a Customer column 602 field which ends with the letter "s". FIG. 13 depicts the table displayed following application of the SQL filter generated by the user's selection of FIG. 12. All rows displayed by application of the updated filter have a Customer column 602 field value ending with the letter "s".

Although the examples shown by FIGS. 10–13 for starting cell selection and ending cell selection are indicative of a selection comprising a single character, one of ordinary skill in the art will readily recognize that any number of starting characters may be selected as may any number of ending characters for a cell.

FIG. 14 depicts the exemplary database table displayed with a middle portion cell selection indicated by reference number 1400. As above, pop up menu 800 indicates the user's selection of the cell for generation of a filter (Filter by Selection). The highlighted portion of a cell at reference number 1400 indicates that the user wishes to generate a filter which retrieves all entries (rows) having a Customer column 602 field value with the letters "er" contained therein. FIG. 15 depicts the table displayed on the user's graphic display 114 as a result of application of the SQL filter generated by the user's selection of FIG. 14. It will be noted that all rows displayed in the table of FIG. 15 have a Customer column 602 value which includes the letter "er" anywhere therein. For example, the first row in FIG. 15 includes the selected letters "er" at the ending portion of the cell value, the second row displayed in FIG. 15 includes the selected letters "er" in the middle portion of the cell value, and the third row includes the selected letters "er" at the starting portion of the cell value. Although the exemplary middle portion selection of FIGS. 14 and 15 describe the selection of a two character filter value, one of ordinary skill in the art will readily recognize that any number of characters may be selected for the middle portion value selection.

FIGS. 16–17 depict exemplary screens associated with the user's selection of multiple cells within a single row generation of an associated SQL filter command. Reference number 1600 of FIG. 16 points to the inverse video highlighted cells comprising the entirety of the Customer column 602 field value and the Employee column 604 value of the sixth row of the table. As above, pop up menu 800 indicates that the user's selection is for purposes of generating a filter by selection. A combination of a plurality of cells selected from multiple columns of a row within the displayed table signifies that the associated comparisons of each column are to be logically AND'd to form the generated filter. In other words, the user's selection of multiple columns indicates that the SQL selection filter is to select only records wherein the Customer column 602 matches the selected Customer column cell and wherein the Employee column 604 matches the selected Employee cell value. FIG. 17 depicts the table displayed on the user's graphical display 114 as the result of applying the generated SQL selection filter. As can be seen in FIG. 17, all selected and displayed rows have both a Customer column 602 value which matches the corresponding selected cell and an Employee column 604 value matching the corresponding selected cell. Although the example of FIGS. 16–17 indicates selection of the entirety of only two adjacent field values, one of ordinary skill in the art will readily recognize that any number of column value selections, adjacent or non-adjacent, selected in their entirety or in part as described above with respect to FIGS. 10–15, may be used to define AND'd clauses within the generated SQL selection filter.

FIGS. 18–19 depict exemplary screen images displayed on the user's graphical display 114 in order to select rows of a displayed table by selection of multiple values in a single column of multiple rows of the displayed database table. Reference number 1800 points to an inverse video highlighted selection comprising two adjacent row values of the Employee column 604. Pop up menu 800, as above, indicates that the user selection is for generation of a filter by selection. The selection of a plurality of rows within a single column indicates that the SQL selection filter command is to select records having any of the selected cell values. In other words, records containing an Employee column 604 value of "Peacock, Margaret" or "Levering, Janet." The generated SQL SELECT command includes multiple comparison clauses logically OR'd to determine the qualifications of records to be selected from the displayed table. FIG. 19 depicts the table displayed on the user's graphical display 114 as the result of application of the SQL selection filter described above with respect to FIG. 18. It will be noted that all rows in the table depicted by FIG. 19 include Employee column 604 entries having a value either of "Peacock, Margaret" or "Levering, Janet." Although the example depicted by FIGS. 18–19 suggest the selection of two full cell values in adjacent rows of a single column, one of ordinary skill in the art will readily recognize that any number of values within a column may be selected, either fully or partially, and either adjacent or non-adjacent, to construct OR'd comparison clauses in the SQL selection filter. Similarly, one of ordinary skill in the art would readily recognize that multiple columns within a row and multiple such rows may be selected to compose complex comparison clauses in the SQL selection filter having both AND'd and OR'd clauses therein. As noted above with respect to FIGS. 2 and 3, multiple entries selected from columns within a single row generate AND'd comparison clauses within the SQL selection filter while multiple rows selected within a single column generate OR'd comparison clauses within the SQL filtration selection filter. It will be noted that combinations of multiple column and multiple row selections, including the possibility for a mixture of full cell, starting portion, ending portion, and middle portion, selections may be utilized to generate a wide variety of complex SQL selection commands. In addition, as noted above, a first user selection generates a current SQL selection filter command. A subsequent selection may be AND'd with the prior selection to permit a user to generate a complex SQL selection filter command.

It will be noted that pop up menu 800 depicted in FIGS. 10–20 includes a "Filter by Selection" option as well as a "Filter Excluding Selection" option. As discussed above, the "Filter by Selection" option generates an SQL selection filter which selects records matching the selected (highlighted) cell values. The "Filter Excluding Selection" option of pop up menu 800 may be utilized by a user to indicate that records matching the selected cell value are to be excluded from the updated display generated by application of the newly generated filter. Again, as noted above, combinations of "Filter by Selection" and "Filter Excluding Selection"

may be generated sequentially by the user to create complex SQL selection filter commands.

Lookup Fields:

The generation of comparison clauses within the SQL selection filter by the methods of the present invention hides information from the user regarding any inner join commands required within the SQL select statement. The methods of the present invention also hide from the user any reformatting required in the SQL select statement to appropriately compare the stored information with the displayed and selected cell values. For example, a displayed cell value such as the Employee column 604 may be displayed as a "lookup field." A lookup field as used herein means a field which displays a value on graphical display 114 which is different than the stored value due to a relation established between the stored value and another table within the stored database. For example, Employee column 604 may be stored within the displayed table as an employee ID. The EmployeeID field represents an encoded value uniquely identifying a particular employee. For convenience of user, the table displayed on graphical display 114 may be displayed using the employee's name rather than the employee's ID number. As shown in FIG. 20, a selection of a value from within the Employee column 604 field selects records based upon an employee name rather than the employee ID. However, the employee ID value is actually stored in the table on mass storage device 112. A separate table of the database stores information associating an employee ID with an employee name. The methods of the present invention which generate the comparison clauses generate all required inner join commands and lookup commands in the SQL SELECT command to establish a relationship between the displayed table as stored in mass storage device 112 and an associated employee table also stored in mass storage device 112. The appropriate SQL SELECT command to create the filter defined by the user selection 2000 of FIG. 20 is as follows:

SELECT * FROM Orders LEFTJOIN [SELECT DISTINCTROW Employees.EmployeeID,[LastName]& "," & [FirstName] AS Name FROM Employees ORDER BY Employees.LastName, Employees.FirstName] AS Lookup_EmployeeID ON Orders.EmployeeID=Lookup_EmployeeID.EmployeeID WHERE (((Lookup_EmployeeID.Name) LIKE "*c*"));

In addition to determining that a selected cell requires generation of appropriate joins and relation lookups, methods of the present invention determine that the selected cell value requires format translation in order to compare the displayed value with the value as stored. For example, as shown in FIG. 21, selection of a required date column 608 value shown by the inverse video highlighting indicated by reference number 2100, requires that the stored data corresponding to the displayed column be reformatted for comparison with the highlighted inverse video selection of "Jul-93." Methods of the present invention therefore generate appropriate SQL command structures within the comparison clause of the selection filter to reformat the required date column 608 stored data for appropriate comparison with the highlighted selected cell value. The SQL select filter command corresponding to the selected cell value 2100 of FIG. 21 is as follows:

SELECT * FROM Orders WHERE (((Format$ ([Orders].[RequiredDate], "Medium Date")) LIKE "*Jul-93"));

Comparison Clause Generation:

FIG. 4 is a flowchart describing the detailed operation of element 236 of FIG. 3. Element 236 of FIG. 3 is operable to generate the details of the SQL SELECT command comparison clause to compare the particular cell value selected within a particular row and column of the displayed table with the corresponding column value stored in the database tables on mass storage device 112. Element 400 of FIG. 4 is first operable to determine whether the user's selection is for filtration (Filter by Selection option of pop-up menu 800) or exclusion filtration (Filter Excluding Selection option of pop-up menu 800). If the user selected a particular cell for exclusion filter, element 402 is then operable to generate a logical "NOT" prefix for the comparison clause. This serves to logically negate the comparison operations generated by subsequent steps 404–426 of FIG. 4.

Element 404 is then operable to determine whether the selected cell table as displayed on graphical display 114 is displayed in a textual format which matches the storage format of the corresponding data in the database table stored on mass storage device 112. If the stored data format and displayed data format do not match, element 406 is next operable to generate appropriate reformatting prefix commands for the comparison clause to follow.

Element 408 is then operable to determine whether the selected cell corresponds to a lookup column of the displayed table. If the selected cell being processed corresponds to a lookup column, element 410 is then operable to generate all required relation and inner join commands to prefix the comparison clause to follow. One of ordinary skill in the art would readily recognize that the precise command syntax generated by elements 402, 406, and 410 are specific to the particular query command language utilized by the underlying database engine. The best presently known mode as discussed herein utilizes SQL standard command syntax for generation of the various prefixes and comparison clauses herein.

Element 412 is next operable to generate the static portion of the comparison clause. Specifically, element 412 generates the portion of comparison clause which determines that the particular column corresponding to the selected field is "LIKE" the value to be generated below by operation of element of 414–426. This portion of the comparison clause is identical regardless of the particular type of cell selection generated by the user's input. Lastly, elements 414–426 are operable to generate a text string which corresponds to the particular type of cell selection generated by the user's input. In particular, element 414 is first operable to determine whether the entire cell being processed was selected (highlighted) by the user's input. If element 414 determines that the entire cell was selected, element 416 is operable to generate a text string corresponding to the entire cell value. Processing is then completed for this comparison clause. Otherwise, element 418 is operable to determine whether the selected cell was selected from its beginning portion. If element 418 determines that the starting portion of the cell was selected, element 420 is next operable to generate a text string for the comparison clause which begins with the selected portion of the cell and ends with characters indicative of a "wild card" match of any further text. As used herein, wild card refers to any syntactic entity contained within a string which causes the SQL selection command interpretation to match any number of any characters. It is common in the SQL command language to utilize the "*" character for this function. Processing is then completed for this particular comparison clause within element 236. Otherwise, element 422 is next operable to determine whether the ending portion of the cell was selected by user input. If the ending portion of the cell was selected, element 424 is operable to generate a text string for the comparison clause which starts with the wild card character "*" and ends with the selected portion of the cell. This completes operation for the comparison clause within element 236. Otherwise, element 426 is operable for a middle portion selection wherein the user input select an interior segment of the cell value excluding the starting characters and ending characters. The comparison string for a middle portion selection begins with a wild card character, followed by the selected interior portion of the cell, terminated by the wild card character. This completes operation of element 236 for generating a comparison clause corresponding to a particular selected cell. As noted above, with regards to FIGS. 2–3 processing then continues within the methods of the present invention to generate comparison clauses appropriate to other cells selected by the user's input.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A computer operable method for generating a database filter comprising:

selecting data on a computer display screen by highlighting a portion of at least one value on said computer display screen that is indicative of a desired filter in response to user supplied input, wherein said data represents a plurality of data values stored in a database table; and generating commands to select database records in accordance with said desired filter.

2. The method of claim 1:

wherein the highlighted portion comprises the entirety of said value on said computer display screen; and wherein the step of generating commands to select includes the step of generating commands to select database records which have a corresponding column value equal to the highlighted portion.

3. The method of claim 1:

wherein the highlighted portion comprises the entirety of said value on said computer display screen; and wherein the step of generating commands to select includes the step of generating commands to select database records which do not have a corresponding column value equal to the highlighted portion.

4. The method of claim 1:

wherein the highlighted portion includes a starting portion of said value and excludes an ending portion of said value on said computer display screen; and wherein the step of generating commands to select includes the step of generating commands to select database records which have a corresponding column value with a starting portion equal to the highlighted portion.

5. The method of claim 1:

wherein the highlighted portion includes a starting portion of said value and excludes an ending portion of said value on said computer display screen; and wherein the step of generating commands to select includes the step of generating commands to select database records which do not have a corresponding column value with a starting portion equal to the highlighted portion.

6. The method of claim 1:

wherein the highlighted portion includes an ending portion of said value and excludes a starting portion of said value on said computer display screen; and wherein the step of generating commands to select includes the step of generating commands to select database records which have a corresponding column value with an ending portion equal to the highlighted portion.

7. The method of claim 1:

wherein the highlighted portion includes an ending portion of said value and excludes a starting portion of said value on said computer display screen; and wherein the step of generating commands to select includes the step of generating commands to select database records which do not have a corresponding column value with an ending portion equal to the highlighted portion.

8. The method of claim 1:

wherein the highlighted portion excludes an ending portion of said value and excludes a starting portion of said value on said computer display screen; and wherein the step of generating commands to select includes the step of generating commands to select database records which have a corresponding column value with any portion equal to the highlighted portion.

9. The method of claim 1:

wherein the highlighted portion excludes an ending portion of said value and excludes a starting portion of said value on said computer display screen; and wherein the step of generating commands to select includes the step of generating commands to select database records which do not have a corresponding column value with any portion equal to the highlighted portion.

10. The method of claim 1:

wherein the highlighted portion is displayed in a first format different than a second format used to store said data values in said database tables; and wherein the step of generating commands to select includes the step of generating commands to translate the highlighted portion from said first format to said second format.

11. The method of claim 1:

wherein the highlighted portion is displayed in a first format different than a second format used to store said data values in said database tables; and wherein the step of generating commands to select includes the step of generating commands to translate the a corresponding column value from said second format to said first format.

12. The method of claim 1:

wherein data not selected by the selecting step represents data stored in a first database table;

wherein data selected by the selecting step represents values stored in a related second database table; and wherein the step of generating commands to select includes the step of generating commands to join said first database table and said second database table.

13. The method of claim 1:

wherein the step of generating commands to select includes the step of generating commands to logically combine a previously generated command to select records with newly generated commands to select records.

14. A computer operable method for generating a database filter comprising the steps of:

displaying presently selected database records of a database on a computer display screen having a plurality of rows and a plurality of columns, wherein the intersection of each of said plurality of rows with each of said plurality of columns is a cell;

graphically selecting, in response to user supplied input, data displayed in at least one cell by highlighting a portion of a value in said at least one cell wherein said value is indicative of records to be selected by a desired filter;

generating SQL commands to select newly selected database records from said presently selected database records in accordance with said desired filter; and displaying said newly selected database records on said computer display screen.

15. The method of claim 14:

wherein the selecting step highlights portions in each of a plurality of cells within one of said plurality of rows; and wherein the step of generating SQL commands to select includes the step of generating commands to select said newly selected database records wherein each of said newly selected database records has a corresponding column value which matches each of the plurality of highlighted portions.

16. The method of claim 14:

wherein the selecting step highlights portions in each of a plurality of cells within one of said plurality of columns; and wherein the step of generating SQL commands to select includes the step of generating commands to select said newly selected database records wherein each of said newly selected database records has a corresponding column value which matches at least one of the plurality of highlighted portions.

17. A program storage device readable by a computer, tangibly embodying a program or instructions executable by the computer to perform the method steps for generating a database filter, said method steps comprising:

selecting data, that represent data values stored in a database table on a computer display screen indicative of a desired filter in response to user supplied input by highlighting a portion of at least one of said data values on said computer display screen; and generating commands to select database records in accordance with said desired filter.

18. The program storage device of claim 17:

wherein the highlighted portion comprises the entirety of said value on said computer display screen; and wherein the step of generating commands to select includes the step of generating commands to select database records which do not have a corresponding column value equal to the highlighted portion.

19. The program storage device of claim 17:

wherein the highlighted portion comprises the entirety of said value on said computer display screen; and wherein the step of generating commands to select includes the step of generating commands to select database records which have a corresponding column value equal to the highlighted portion.

20. The program storage device of claim 19:

wherein the highlighted portion includes a starting portion of said value and excludes an ending portion of said value on said computer display screen; and wherein the step of generating commands to select includes the step of generating commands to select database records which have a corresponding column value with a starting portion equal to the highlighted portion.

21. The program storage device of claim 19:

wherein the highlighted portion includes a starting portion of said value and excludes an ending portion of said value on said computer display screen; and wherein the step of generating commands to select includes the step of generating commands to select database records which do not have a corresponding column value with a starting portion equal to the highlighted portion.

22. The program storage device of claim 19:

wherein the highlighted portion includes an ending portion of said value and excludes a starting portion of said value on said computer display screen; and wherein the step of generating commands to select includes the step of generating commands to select database records which have a corresponding column value with an ending portion equal to the highlighted portion.

23. The program storage device of claim 19:

wherein the highlighted portion includes an ending portion of said value and excludes a starting portion of said value on said computer display screen; and wherein the step of generating commands to select includes the step of generating commands to select database records which do not have a corresponding column value with an ending portion equal to the highlighted portion.

24. The program storage device of claim 19:

wherein the highlighted portion excludes an ending portion of said value and excludes a starting portion of said value on said computer display screen; and wherein the step of generating commands to select includes the step of generating commands to select database records which have a corresponding column value with any portion equal to the highlighted portion.

25. The program storage device of claim 19:

wherein the highlighted portion excludes an ending portion of said value and excludes a starting portion of said value on said computer display screen; and wherein the step of generating commands to select includes the step of generating commands to select database records which do not have a corresponding column value with any portion equal to the highlighted portion.

26. The program storage device of claim 19:

wherein the highlighted portion is displayed in a first format different than a second format used to store said data values in said database tables; and wherein the step of generating commands to select includes the step of generating commands to translate the highlighted portion from said first format to said second format.

27. The program storage device of claim 19:

wherein the highlighted portion is displayed in a first format different than a second format used to store said data values in said database tables; and wherein the step of generating commands to select includes the step of generating commands to translate the a corresponding column value from said second format to said first format.

28. The program storage device of claim 19:

wherein data not selected by the selecting step represents data stored in a first database table;

wherein data selected by the selecting step represents values stored in a related second database table; and wherein the step of generating commands to select includes the step of generating commands to join said first database table and said second database table.

29. The program storage device of claim 17:

wherein the step of generating commands to select includes the step of generating commands to logically combine a previously generated command to select records with newly generated commands to select records.

30. A program storage device readable by a computer, tangibly embodying a program or instructions executable by the computer to perform the method steps for generating a database filter, said method steps comprising:

displaying presently selected database records of a database on a computer display screen having a plurality of rows and a plurality of columns, wherein the intersection of each of said plurality of rows with each of said plurality of columns is a cell;

graphically selecting, in response to user supplied input, data displayed in at least one cell by highlighting a portion of a value in said at least one cell wherein said value is indicative of records to be selected by a desired filter;

generating SQL commands to select newly selected database records from said presently selected database records in accordance with said desired filter; and displaying said newly selected database records on said computer display screen.

31. The program storage device of claim 30:

wherein the selecting step highlights portions in each of a plurality of cells within one of said plurality of rows; and wherein the step of generating SQL commands to select includes the step of generating commands to select said newly selected database records wherein each of said newly selected database records has a corresponding column value which matches each of the plurality of highlighted portions.

32. The program storage device of claim 30:

wherein the selecting step highlights portions in each of a plurality of cells within one of said plurality of columns; and wherein the step of generating SQL commands to select includes the step of generating commands to select said newly selected database records wherein each of said newly selected database records has a corresponding column value which matches at least one of the plurality of highlighted portions.

* * * * *